(12) United States Patent
Hyoudou et al.

(10) Patent No.: US 9,699,097 B2
(45) Date of Patent: Jul. 4, 2017

(54) NETWORK SYSTEM, METHOD OF CONTROLLING THEREOF, NETWORK CONTROL APPARATUS, AND NON-TRANSITORY COMPUTER-READABLE RECORDING MEDIUM HAVING STORED THEREIN CONTROL PROGRAM THEREOF

(71) Applicant: FUJITSU LIMITED, Kawasaki-shi, Kanagawa (JP)

(72) Inventors: Kazuki Hyoudou, Chofu (JP); Yukihiro Nakagawa, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 0 days.

(21) Appl. No.: 14/454,831

(22) Filed: Aug. 8, 2014

(65) Prior Publication Data

US 2015/0049638 A1 Feb. 19, 2015

(30) Foreign Application Priority Data

Aug. 19, 2013 (JP) .................................. 2013-169867

(51) Int. Cl.
*H04L 12/851* (2013.01)
*H04L 12/721* (2013.01)
(Continued)

(52) U.S. Cl.
CPC ...... *H04L 47/2483* (2013.01); *H04L 12/4641* (2013.01); *H04L 41/0803* (2013.01); *H04L 45/38* (2013.01)

(58) Field of Classification Search
CPC .. H04L 12/4641; H04L 45/38; H04L 47/2483
See application file for complete search history.

(56) References Cited

U.S. PATENT DOCUMENTS 8,605,734 B2 12/2013 Ichino
2003/0123459 A1* 7/2003 Liao ..................... H04L 29/06
370/401

(Continued)

FOREIGN PATENT DOCUMENTS

| JP | 2011-188433 | 9/2011 |
| JP | 2012-090058 | 5/2012 |
| WO | 2010-103909 | 9/2010 |

OTHER PUBLICATIONS

Okazaki,Yuta et al.,The Multilayer Path Control of the Fat-Tree Network by Open Flow, the 75th (Heisei 25(2013)) National Conference Lecture Collected-Papers (1) Architecture Software Acience and Engineering a Database, Media, General Incorporated Foundation, Information Processing Society of Japan, Mar. 6, 2013, pp. 1-257-1-258, with English Translation.

(Continued)

*Primary Examiner* — Siming Liu
(74) *Attorney, Agent, or Firm* — Fujitsu Patent Center

(57) ABSTRACT

A network system includes a transmitting/receiving apparatus, a plurality of switches, and a network control apparatus. The switch includes a first packet transmission control unit and a second packet transmission control unit. The network system includes a first packet transmission control area according to the first packet transmission control unit, and a second packet transmission control area according to the second packet transmission control unit. A switch in the first packet transmission control area includes a first storage unit which stores a plurality of pieces of first rule information informed from the network control apparatus, applies a mask to a predetermined position of header information of an input packet according to the number of the plurality of pieces of first rule information, and controls the input packet (Continued)

according to the first rule information selected from the first storage unit based on the header information after masking.

12 Claims, 30 Drawing Sheets

(51) Int. Cl.
*H04L 12/24* (2006.01)
*H04L 12/46* (2006.01)

(56) References Cited

U.S. PATENT DOCUMENTS

2013/0046882 A1\* 2/2013 Takashima .............. H04L 45/38
709/224
2013/0177016 A1 7/2013 Nakano et al.
2015/0026794 A1\* 1/2015 Zuk .................... H04L 63/0227
726/13

OTHER PUBLICATIONS

Japanese Office Action mailed Apr. 4, 2017 for corresponding Japanese Patent Application No. 2013-169867, with Partial English Translation, 4 pages.

\* cited by examiner

Rule: Ingress Port | MAC src | MAC dst | Ether type | VLAN ID | VLAN pri | IP src | IP dst | IP proto | IP ToS | L4 sport | L4 dport Action: If L4 TCP/UDP src port matches, forward packet to port (path selection)

FIG. 8A

| Rule | Ingress Port | MAC src | MAC dst | Ether type | VLAN ID | VLAN pri | IP src | IP dst | IP proto | IP ToS | L4 sport | L4 dport |
|---|---|---|---|---|---|---|---|---|---|---|---|---|

FIG. 8B

| Action | If MAC dst matches, forward packet to port |
|---|---|

FIG. 9A

|  | Ingress Port | MAC src | MAC dst | Ether type | VLAN ID | VLAN pri | IP src | IP dst | IP proto | IP ToS | L4 sport | L4 dport |
|---|---|---|---|---|---|---|---|---|---|---|---|---|
| Data | 1 | SA1 | DA1 | 0x0800 | 10 | 1 | SIP1 | DIP1 | 17 | 0 | 1023 | 8474 |

| Bit Mask Value | 0xff...f | 0xffffff | 0xffff | 0xffff | 00xfff | 0xf | 0xffff | 0xffff | 0xffff | 0xff | 0x0001 | 0xffff |

| Data after masking | 1 | SA1 | DA1 | 0x0800 | 10 | 1 | SIP1 | DIP1 | 17 | 0 | 1 | 8474 |

|  | Ingress Port | MAC src | MAC dst | Ether type | VLAN ID | VLAN pri | IP src | IP dst | IP proto | IP ToS | L4 sport | L4 dport |
|---|---|---|---|---|---|---|---|---|---|---|---|---|
| Rule1 | ALL | * | * | * | * | * | * | * | * | * | 0 | * |
| Rule2 | ALL | * | * | * | * | * | * | * | * | * | 1 | * ← B4 |

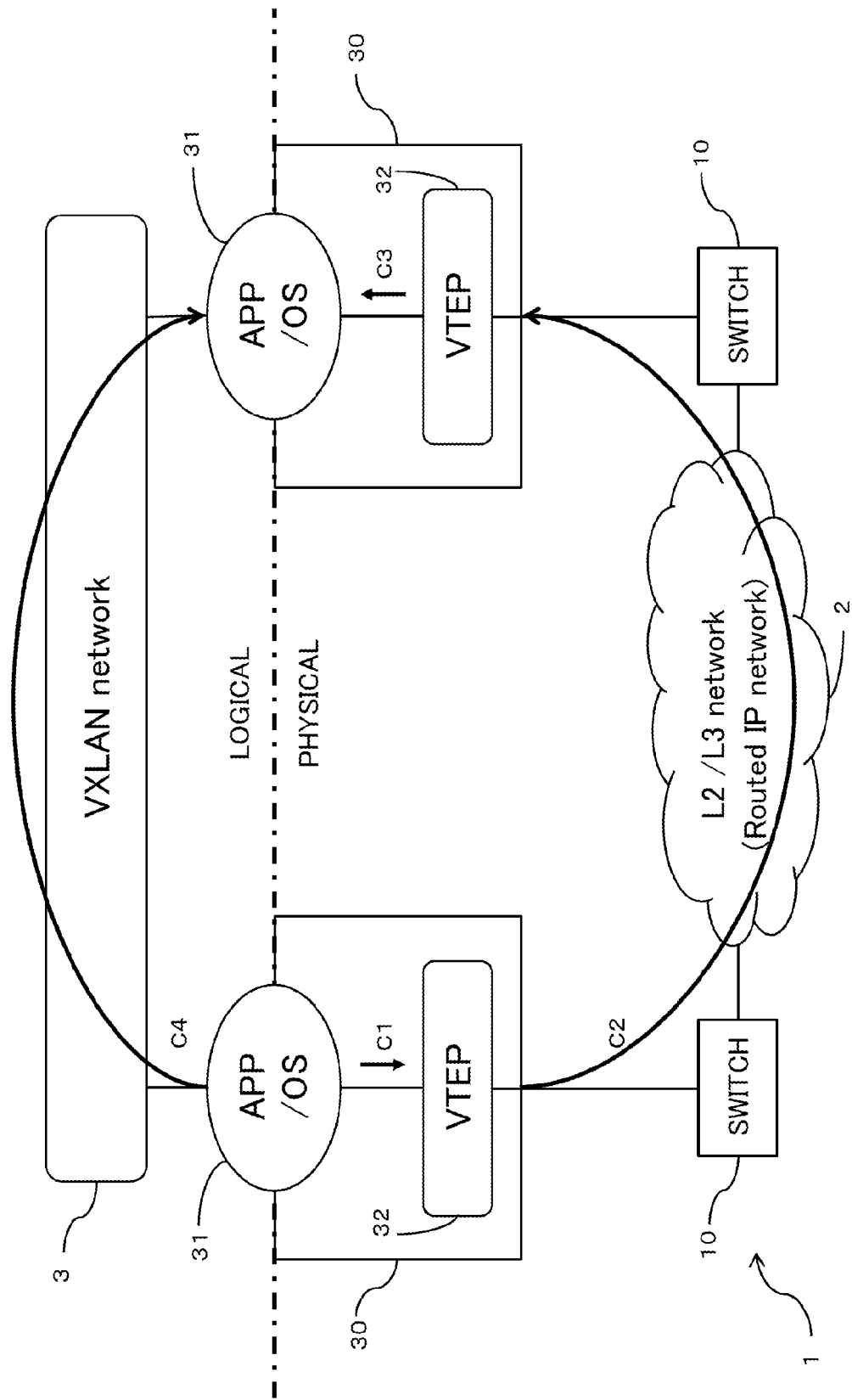

FIG. 11A

| VTEP MAC DA | VTEP MAC SA | VTEP IP DA | VTEP IP SA | UDP | VNI | MAC DA | MAC SA | Type | Data |
|---|---|---|---|---|---|---|---|---|---|

{Outer Header} {Original Frame}

FIG. 11B

| |
|---|
| Destination VTEP MAC Address (H) | ← Outer Ethernet Header
| Source VTEP MAC Address (L) |
| Source VTEP MAC Address (H) |
| Optional EtherType (C-Tag 802.1Q) | Outer VLAN Tag Information |
| EtherType 0x0800 (IP Packet) |
| Version | IHL | ToS | ← Outer IP Header
| Total Length | Identification |
| Flags | Protocol | Header Checksum |
| Source VTEP IP Address |
| Destination VTEP IP Address |
| Source Port = xxxx | Dest Port = VXLAN Port | ← Outer UDP Header
| UDP Length | UDP Checksum |
| Flags | Reserved | ← VXLN Header
| VXLAN Network Identifier (VNI) | Reserved |
| Original MAC Destination Address (H) | ← Inner Ethernet Frame (Original Frame)
| Original MAC DA (L) | Original MAC SA (H) |
| Original MAC Source Address (L) |
| Original Ethernet Payload |

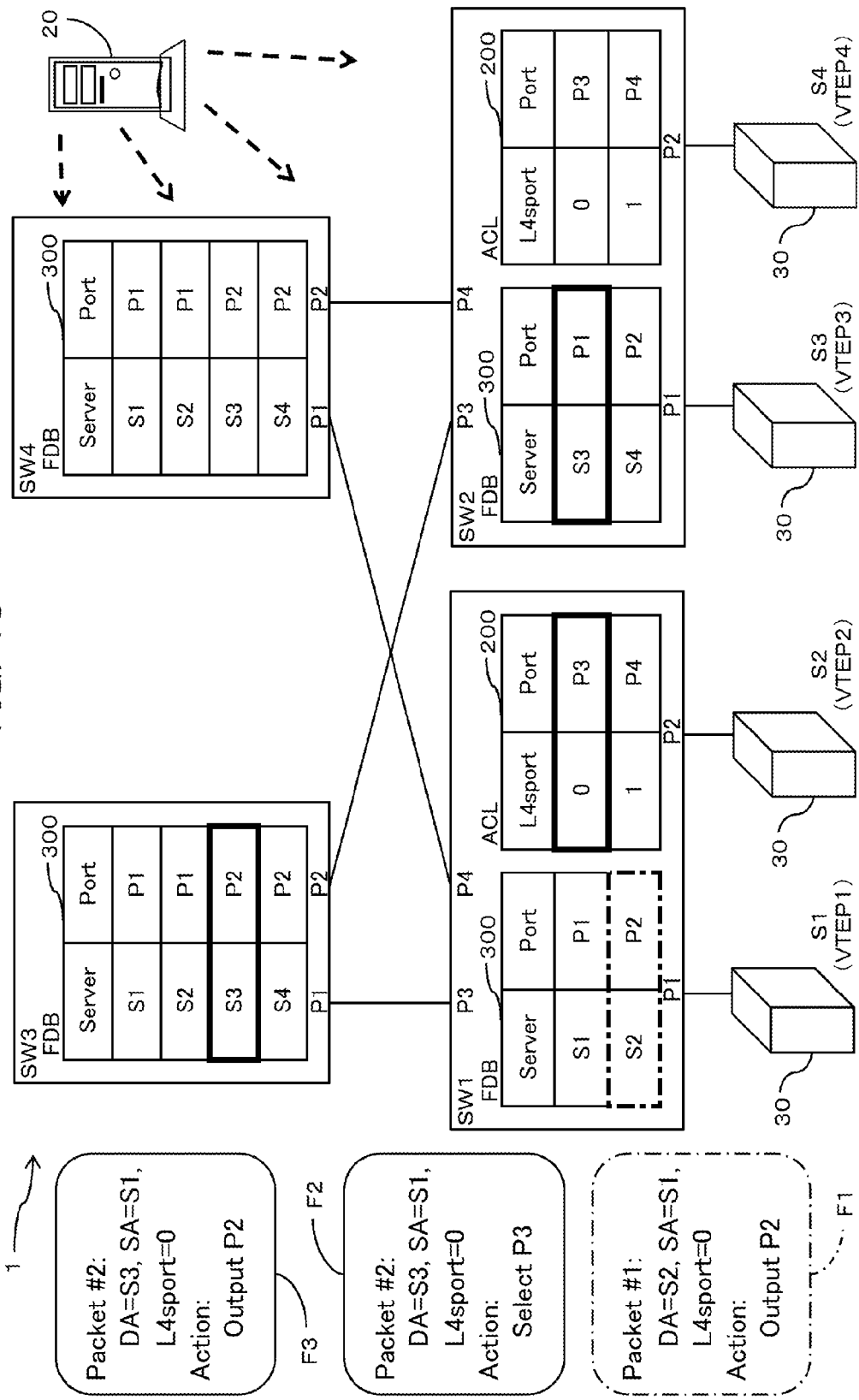

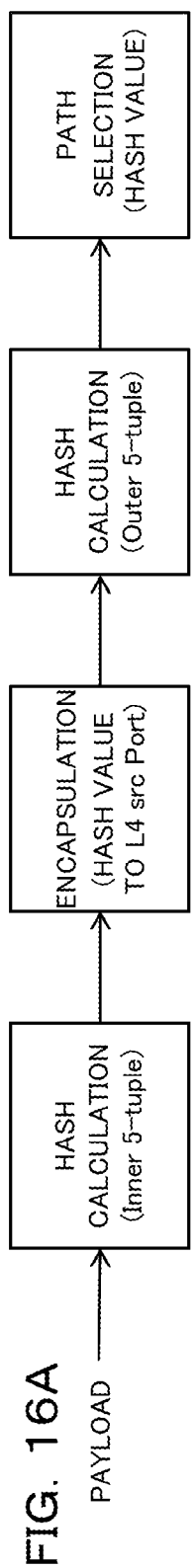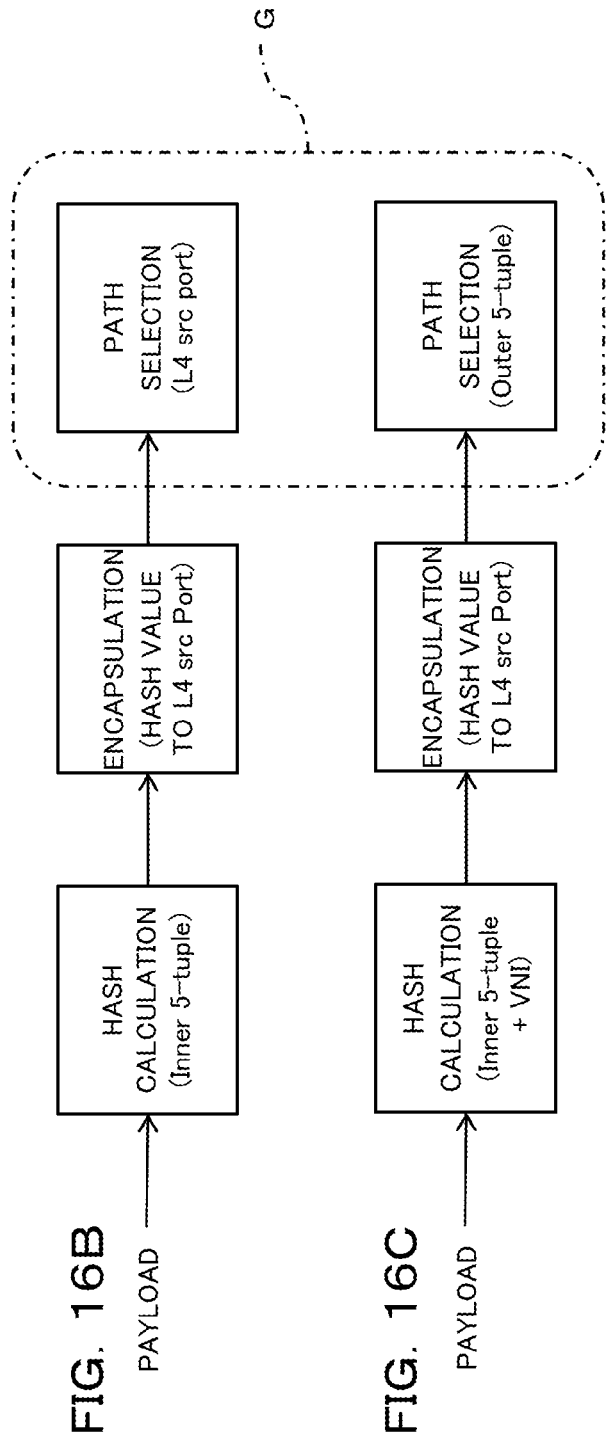
FIG. 16A
FIG. 16B
FIG. 16C

FIG. 18

Algorithm: Make Flow List for EMT
Input: Network topology tree $T$
1. flow list $L = \{\}$
2. For each root-node $r$ of $T$ // multiple root exist in Fat-tree
3.     SearchTree($r$)
4. Return $L$
function SearchTree($n$)
5. If(node-type($n$) == Server) Return { node-id($n$) } // leaf machine
6. Else $S = \{\}$
7.     For each subtree $v$ of $n$
8.         $p$ = connected-port($n$, $v$) // port No. of $n$, which is connected to $v$
9.         $Sv$ = SearchTree($v$)
10.         For each element $e$ of $Sv$
11.             $L = L + \{\{\text{id}=>\text{node-id}(n), \text{op}=>\text{Add}, \text{rule}=e, \text{act}=\text{Forward to } p\}\}$
12.     $S = S + Sv$
13. Return $S$

FIG. 25

|  | Back to Back CONFIGURATION | | Fat Tree CONFIGURATION | |
|---|---|---|---|---|
|  | RELATED ART | EMBODIMENT | RELATED ART | EMBODIMENT |
| #VTEP or #host (h) | 2 | 8 | 8 | 8 |
| #VM per host (v) | 8 | 8 | 8 | 8 |
| max. #host underneath of switch (s) | 1 | 1 | 8 | 8 |
| #server-facing port of switch (p) | 1 | 1 | 2 | 2 |
| #multipath per switch (m) | 2 | 2 | 2 | 2 |
| max. #path on switch (t= h*(h−1)*v*v) | 128 | 128 | 3584 | 3584 |
| max. #FDB entries per switch (f) | — | 1 (=s) | — | 8 (=s) |
| max. #ACL entries per switch (a) | 128 (=t) | 2 (=m*p) | 3584 (=t) | 4 (=m*p) |
| Total # Flow table entries per switch (f+a) | 128 | 3 | 3584 | 12 |

FIG. 28

|  | Back to Back CONFIGURATION | | Fat Tree CONFIGURATION | |
| --- | --- | --- | --- | --- |
|  | RELATED ART | MODIFIED EXAMPLE | RELATED ART | MODIFIED EXAMPLE |
| #VTEP or #host (h) | 2 | 8 | 8 | 8 |
| #VM per host (v) | 8 | 8 | 8 | 8 |
| max. #host underneath of switch (s) | 1 | 1 | 8 | 8 |
| #server-facing port of switch (p) | 1 | 1 | 2 | 2 |
| #multipath per switch (m) | 2 | 2 | 2 | 2 |
| max. #path on switch (t= h*(h−1)*v*v) | 128 | 128 | 3584 | 3584 |
| max. #FDB entries per switch (f) | − | 16 (=v*s) | − | 64 (=v*s) |
| max. #ACL entries per switch (a) | 128 (=t) | 2 (=m*p) | 3584 (=t) | 4 (=m*p) |
| Total # Flow table entries per switch (f+a) | 128 | 18 | 3584 | 68 |

FIG. 30

| Switch | DEVICE 1 | DEVICE 2 | DEVICE 3 | DEVICE 4 |
|---|---|---|---|---|
| Switch capability | 1.28Tbps | 1.28Tbps | 1.28Tbps | 1.28Tbps |
| VLAN table | 4k | 4k | 4k | 4k |
| Mac table | 128k | 128k | 128k | 120k |
| L3 routing table | 16k | 8k | 16k | 8k |
| Multicast tble | 4k | 2k | 8k | 3.5k |
| ACL | 2k ingress/ 1k egress | 2k ingress/ 1k egress | 3k | 1.5k |

NETWORK SYSTEM, METHOD OF CONTROLLING THEREOF, NETWORK CONTROL APPARATUS, AND NON-TRANSITORY COMPUTER-READABLE RECORDING MEDIUM HAVING STORED THEREIN CONTROL PROGRAM THEREOF

CROSS-REFERENCE TO RELATED APPLICATIONS

This application is based upon and claims the benefit of priority of the prior Japanese Patent Application No. 2013-169867, filed on Aug. 19, 2013, the entire contents of which are incorporated herein by reference.

FIELD

The embodiment discussed herein is directed to a network system, a control method thereof, a network control apparatus, and a non-transitory computer-readable recording medium having stored therein a control program thereof.

BACKGROUND

As an integrated management mechanism performing multilayer flow control under a centralized supervisory controller, there is OpenFlow. In the OpenFlow, a packet/field and a rule defining a flow are referred using wildcards to identify the flow, so that it is possible to perform control at a flow level.

[Patent Literature 1] International Publication Pamphlet No. WO 2010/103909 A

[Patent Literature 2] Japanese Laid-open Patent Publication No. 2012-090058 A

[Patent Literature 3] Japanese Laid-open Patent Publication No. 2011-188433 A

However, the flow control described above has a problem in that the number of entries of an Access Control List (ACL) to verify the flow is insufficient.

FIG. 29 is a diagram schematically illustrating a configuration of a network system in the related art.

A network system 5 exemplified in FIG. 29 includes twelve switches 50 and eight server apparatuses 60.

Each server apparatus 60 is communicably connected to the other server apparatuses 60 through one or a plurality of switches 50, and the network system 5 forms a Fat Tree structure. Further, each server apparatus 60 creates a virtual environment 60a. Then, eight Virtual Machines (VMs) 61 are deployed on a memory (not illustrated) provided in each server apparatus 60, and the deployed VMs 61 are executed on a Central Processing Unit (CPU, not illustrated) which is provided in each server apparatus 60.

Herein, assuming that the number of hosts (the server apparatuses 60) in the network is assumed to be h and the number of VMs 61 in each host is assumed to be v, the number of VMs 61 in the network is obtained by h*v=64. Further, the number of flows which are generated on the network is obtained as follows.

$$t=(v*((h-1)*v))*h=h*(h-1)*v*v$$

Then, in the network system 5 of h=8 and v=8 as illustrated in FIG. 29, the number of VMs 61 is obtained by h*v=64, and the number of flows is obtained as t=3584 by the above equation.

In other words, 3584 flows are required in communication among 64 VMs 61 at most. A network system under normal operations may include more server apparatuses (VMs) compared to the server apparatuses 60 (VMs 61) illustrated in FIG. 29, and the number of flows is increased further more.

FIG. 30 is a diagram illustrating specifications of switches in the related art.

A rule for defining a flow in the OpenFlow is installed on a Ternary Content Addressable Memory (TCAM) provided in the switch.

However, since the TCAM occupies a large mounting area and consumes a large amount of power, the number of entries of the ACL (the number of flows to be registered) is small.

As exemplified in FIG. 30, switches (device 1 to device 4) in the related art include only about 1 k to 3 k entries of the ACL.

As described above using FIG. 29, the network system 5 including 64 VMs 61 at most requires 3584 flows, and thus the number of entries of the ACL is not sufficient for a commodity switch in the related art. Therefore, there is a problem in that the scale of the network which can be managed using the OpenFlow is restricted.

SUMMARY

According to an embodiment, there is provided a network system which includes a transmitting/receiving apparatus, a plurality of switches, and a network control apparatus. The switch includes a first packet transmission control unit and a second packet transmission control unit. The network system includes a first packet transmission control area according to the first packet transmission control unit, and a second packet transmission control area according to the second packet transmission control unit. A switch which is included in the first packet transmission control area among the plurality of switches is configured to include, in the first packet transmission control unit, a first storage unit which stores a plurality of pieces of first rule information informed from the network control apparatus, and to apply a mask to a predetermined position of header information of an input packet according to the number of the plurality of pieces of first rule information, and to control the input packet according to the first rule information selected from the first storage unit based on the header information after masking.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 8A is a diagram illustrating a Rule field of the flow definition of an FDB base which is used by the network system according to the embodiment;

FIG. 8B is a diagram illustrating an Action field of the flow definition of the FDB base which is used by the network system according to the embodiment;

FIGS. 9A to 9D are diagrams illustrating an exemplary matching of the flow control of the ACL base in the network system according to the embodiment;

FIG. 10 is a diagram for describing a VXLAN which is used by the network system according to the embodiment;

FIG. 11A is a diagram illustrating an outline of a VXLAN packet which is used by the network system according to the embodiment;

FIG. 11B is a diagram illustrating the details of the VXLAN packet which is used by the network system according to the embodiment;

FIG. 15 is a diagram for describing a flow control in a Fat Tree structure of the network system according to the embodiment;

FIGS. 16A to 16C are diagrams for describing hash calculation in the network system according to the embodiment;

FIG. 18 is a diagram illustrating an exemplary algorithm which is used in a process of creating the flow list in the network system according to the embodiment;

FIG. 25 is a diagram illustrating the numbers of entries which are used in a network system in the related art and in the network system of the embodiment;

FIG. 28 is a diagram illustrating the numbers of entries which are used in the network system in the related art and in the network system of the first and second modified examples;

FIG. 30 is a diagram illustrating specifications of switches in the related art.

DESCRIPTION OF EMBODIMENTS

Figure 1:
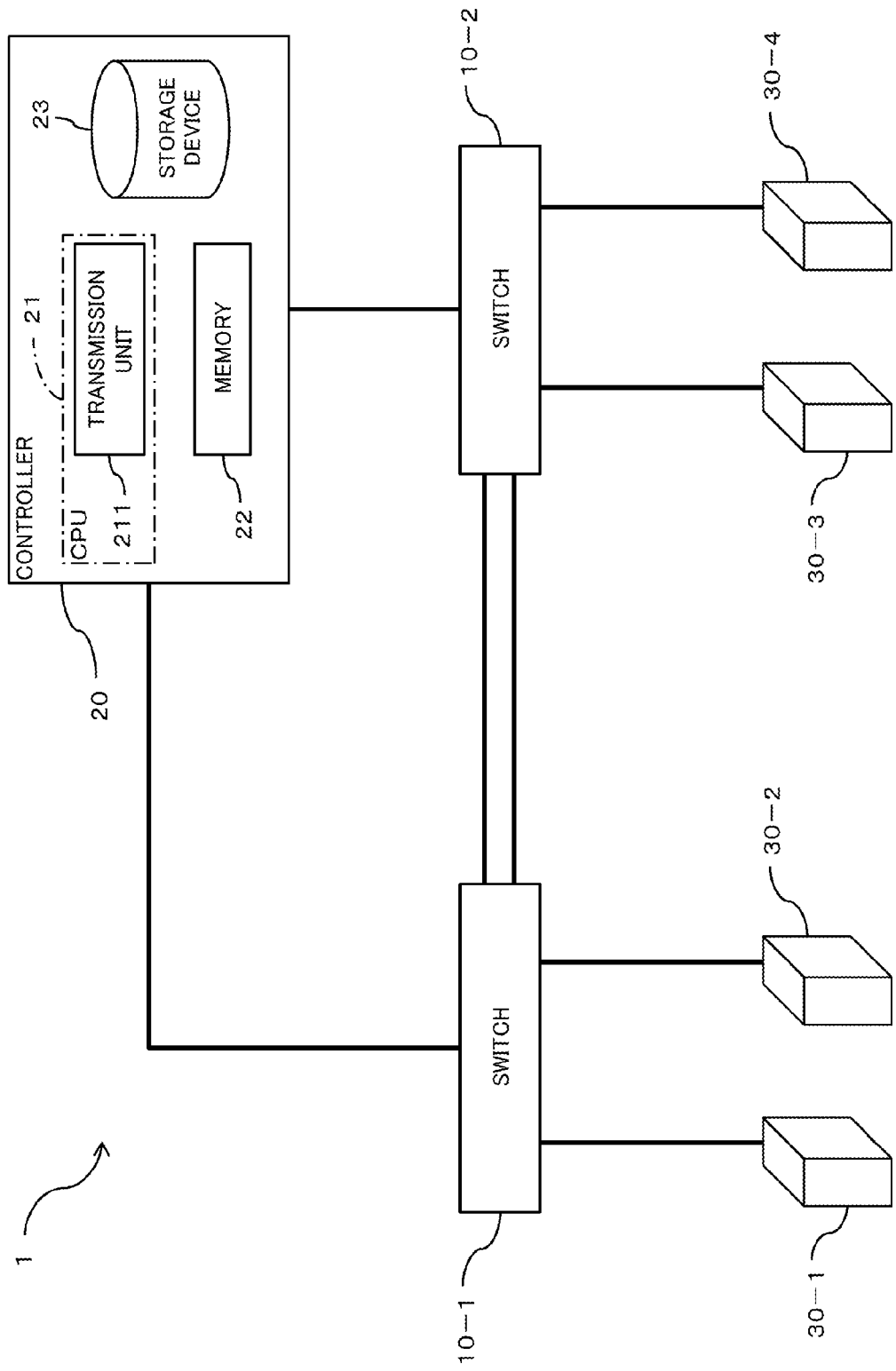
FIG. 1 is a diagram schematically illustrating a functional configuration of a network system according to an embodiment.

Hereinafter, an embodiment of a network system, a control method thereof, a network control apparatus, and a computer-readable recording medium having stored therein a control program thereof will be described with reference to the drawings. However, the following embodiment is given as merely exemplary, and it is not intended to exclude various modifications and various technical applications which are not specified in the embodiment. In other words, the embodiment can be implemented in various forms within a scope not departing from the spirit thereof.

Further, only the components illustrated in the drawings are not essential, but other functions may be included in the respective drawings.

Hereinafter, the same components in the drawings will be denoted with the same symbols, and the description thereof will not be repeated.

[A] EMBODIMENT

[A-1] System Configuration

FIG. 1 is a diagram schematically illustrating a functional configuration of a network system according to an embodiment.

As illustrated in FIG. 1, a network system 1 according to the embodiment includes switches 10-1 and 10-2, a controller (network control apparatus) 20, and server apparatuses (transmitting/receiving apparatuses) 30-1 to 30-4. Each of the server apparatuses 30-1 to 30-4 is communicably connected to the other server apparatuses 30-1 to 30-4 through one or two of the switches 10-1 and 10-2. For example, the server apparatus 30-1 is communicably connected to the server apparatus 30-2 through the switch 10-1. Further, the server apparatus 30-1 is communicably connected to the server apparatus 30-3 through the switches 10-1 and 10-2.

Hereinafter, as a symbol for indicating a switch, when there is a need to specify one of a plurality of switches, the symbols 10-1 and 10-2 will be used, but when any switch is indicated, the symbol 10 will be used. Further, in the following, as a symbol for indicating a server apparatus, when there is a need to specify one of a plurality of server apparatuses, the symbols 30-1 to 30-4 will be used, but when any server apparatus is indicated, the symbol 30 will be used.

For example, a server apparatus 30 is a computer which has a server function. In the example illustrated in FIG. 1, the network system 1 includes four server apparatuses 30-1 to 30-4, but three or less or five or more server apparatuses 30 may be considered to be included.

The controller 20 controls a plurality of switches 10, and sets each switch 10 to perform a flow control. As illustrated in FIG. 1, the controller 20 includes a CPU (processor) 21, a memory 22, and a storage device 23.

For example, the storage device 23 is an existing device with which data is readably and writably stored such as a Hard Disk Drive (HDD) and a Solid State Drive (SSD). For example, in the embodiment, the storage device 23 stores a flow list 100 (setting data which will be described below using FIG. 3 and the like).

The memory 22 is a storage device which includes a Read Only Memory (ROM) and a Random Access Memory (RAM). In the ROM of the memory 22, a program such as a Basic Input/Output System (BIOS) can be written. The software program on the memory 22 is appropriately read and executed by the CPU 21. Further, the RAM of the memory 22 is used as a primary recording memory or a working memory.

The CPU 21 is a processor which performs various controls and calculations, and performs various functions by executing OS and programs stored in the memory 22. In other words, as illustrated in FIG. 1, the CPU 21 functions as a transmission unit 211.

A program (control program) for performing a function as the transmission unit 211, for example, is provided as a form of a computer-readable recording medium such as a flexible disk, a CD (such as a CD-ROM, a CD-R, and a CD-RW), a DVD (such as a DVD-ROM, a DVD-RAM, a DVD-R, a DVD+R, a DVD-RW, a DVD+RW, and an HD DVD), a Blu-ray disk, a magnetic disk, an optical disk, and a magneto-optical disk. Then, a computer reads the program from the recording medium through a reading device (not illustrated), transmits and stores the program to and in an internal recording device or an external recording device, uses the program. Alternatively, the program, for example, may be stored in a storage device (recording medium) such as a magnetic disk, an optical disk, and a magneto-optical disk, and provided to the computer from the storage device through a communication path.

When the function as the transmission unit 211 is realized, a program stored in an inner storage device (the memory 22 in the embodiment) is executed by a microprocessor (the CPU 21 in the embodiment) of the computer. At this time, the program recorded in the recording medium may be read by the computer for the execution.

The transmission unit 211 transmits rule information for packet transmission to a plurality of switches 10 according to a plurality of packet transmission control methods. Specifically, the transmission unit 211 reads out the flow list 100 stored in the storage device 23, and transmits the rule information included in the read flow list 100 to the corresponding switch 10.

Figure 2:
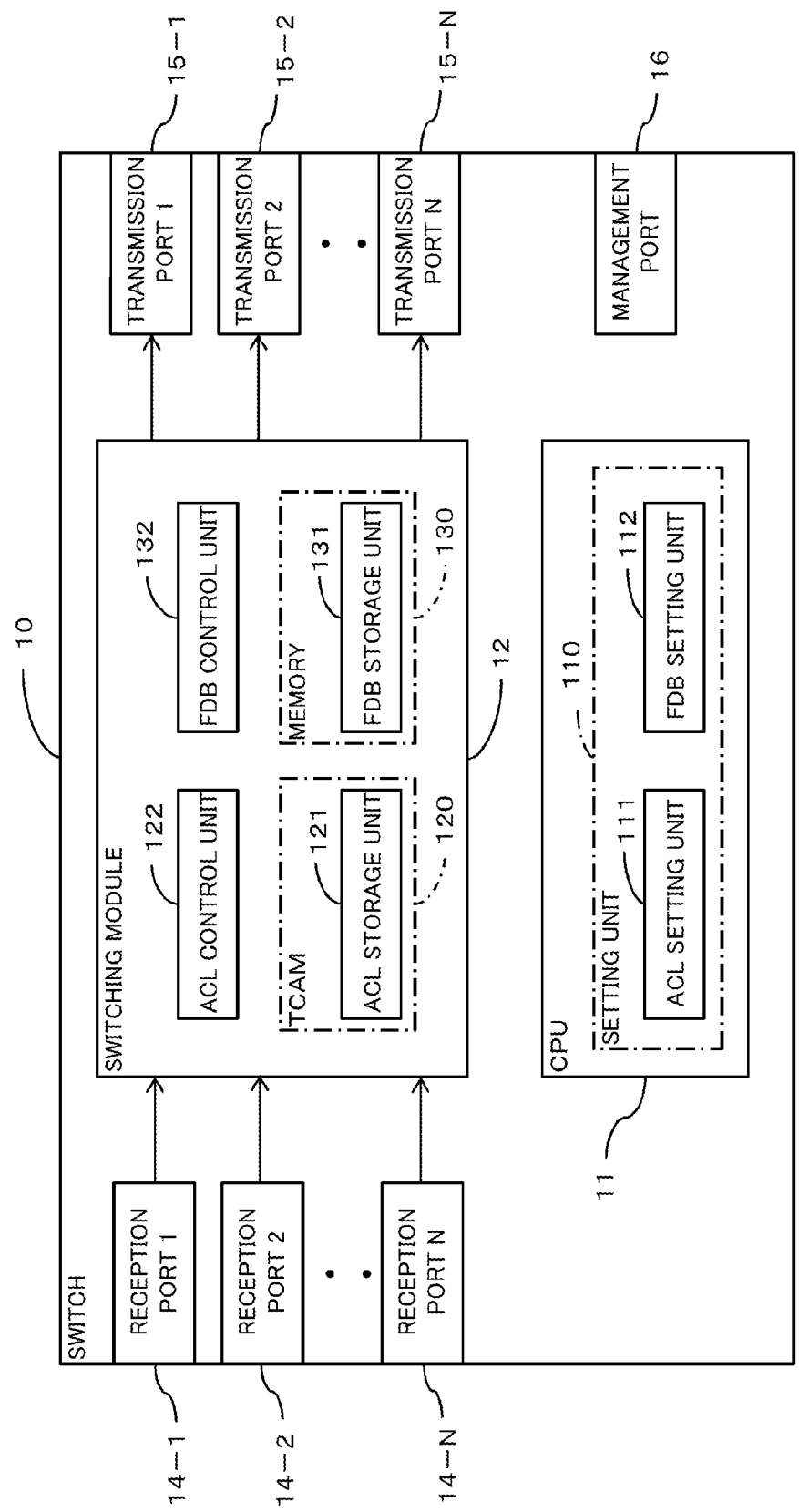
FIG. 2 is a diagram schematically illustrating a functional configuration of a switch which is provided in the network system according to the embodiment.

FIG. 2 is a diagram schematically illustrating a functional configuration of a switch which is provided in the network system according to the embodiment.

The switch 10 transfers a packet which is transmitted or received between the respective server apparatuses 30. As illustrated in FIG. 2, the switch 10 includes a CPU 11, a switching module 12, reception ports 14-1 to 14-N (hereinafter, N is an integer of 1 or higher), transmission ports 15-1 to 15-N, and a management port 16.

Hereinafter, as a symbol for indicating a reception port, when there is a need to specify one of a plurality of reception ports, the symbols 14-1 to 14-N will be used, but when any reception port is indicated, the symbol 14 will be used. Further, in the following, as a symbol for indicating a transmission port, when there is a need to specify one of a plurality of transmission ports, the symbols 15-1 to 15-N will be used, but when any transmission port is indicated, the symbol 15 will be used.

The reception port 14 is an interface through which a packet transmitted from another device is received. Specifically, the reception port 14 is communicably connected to another switch 10 or another server apparatus 30, and receives a packet transmitted from the switch 10 or the server apparatus 30. For example, the reception port 14 provided in the switch 10-1 illustrated in FIG. 1 is communicably connected to the switch 10-2 and the server apparatuses 30-1 and 30-2.

The transmission port 15 is an interface through which a packet is transmitted to another device. Specifically, the transmission port 15 is communicably connected to another switch 10 or another server apparatus 30, and transmits a packet to the switch 10 or the server apparatus 30. For example, the transmission port 15 provided in the switch 10-1 illustrated in FIG. 1 is communicably connected to the switch 10-2 and the server apparatuses 30-1 and 30-2.

The management port 16 is an interface which is communicably connected to the controller 20, receives data transmitted from the controller 20, and transmits data to the controller 20. In the embodiment, the management port 16 receives the flow list 100 transmitted from the transmission unit 211 of the controller 20. Further, the management port 16 transmits a setting result on the switch 10 based on the received flow list 100 to the controller 20.

The CPU 11 is a processor which performs various controls and calculations, and realizes various functions by executing OS and programs stored in a memory (not illustrated) or a memory 130 (described below) which is provided in the switching module 12. In other words, as illustrated in FIG. 2, the CPU 11 functions as a setting unit 110 (an ACL setting unit 111 and an FDB setting unit 112).

A program for realizing the function as the setting unit 110 (the ACL setting unit 111 and the FDB setting unit 112), for example, is provided as a form of a computer-readable recording medium such as a flexible disk, a CD (such as a CD-ROM, a CD-R, and a CD-RW), a DVD (such as a DVD-ROM, a DVD-RAM, a DVD-R, a DVD+R, a DVD-RW, a DVD+RW, and an HD DVD), a Blu-ray disk, a magnetic disk, an optical disk, and a magneto-optical disk. Then, a computer reads the program from the recording medium through a reading device (not illustrated), transmits and stores the program to and in an internal recording device or an external recording device, and uses the program. Further, the program, for example, may be stored in a storage device (recording medium) such as a magnetic disk, an optical disk, and a magneto-optical disk, and provided to the computer from the storage device through a communication path.

When the function as the setting unit 110 (the ACL setting unit 111 and the FDB setting unit 112) is realized, a program stored in an inner storage device (a memory (not illustrated) or the memory 130 (described below) which is provided in a switching module 12 in the embodiment) is executed by a microprocessor (the CPU 11 in the embodiment) of the computer. At this time, a program recorded in the recording medium may be read out by the computer for the execution.

As illustrated in FIG. 2, the setting unit 110 functions as the ACL setting unit 111 and the FDB setting unit 112.

The ACL setting unit 111 sets a flow table regarding the flow control according to an ACL. Specifically, the ACL setting unit 111 registers an ACL table (first rule information which will be described below using FIG. 14 and the like) 200 which is used for controlling the packet transmission according to the ACL among the plurality of packet transmission control methods based on the flow list 100 received from the transmission unit 211 of the controller 20.

The FDB setting unit 112 sets a flow table regarding the flow control according to a Forwarding Database (FDB). Specifically, the FDB setting unit 112 registers an FDB table (second rule information which will be described below using FIG. 14 and the like) 300 which is used for controlling the packet transmission according to the FDB different from the ACL among the plurality of packet transmission control methods based on the flow list 100 received from the transmission unit 211 of the controller 20.

The switching module 12 includes a switch circuit (not illustrated; for example, a crossbar switch), which freely changes a path for every input packet. As illustrated in FIG. 2, the switching module 12 includes a TCAM 120 and the memory 130, and functions as an ACL control unit 122 and an FDB control unit 132.

The TCAM 120 is a storage device having an area for storing a mask value added to a typical CAM (associative memory) in which data is retrieved and accessed using a key. As illustrated in FIG. 2, the TCAM 120 functions as an ACL storage unit (first storage unit) 121.

The ACL table 200 is stored in the ACL storage unit 121. In other words, the ACL setting unit 111 of the CPU 11 stores the ACL table 200 in the ACL storage unit 121.

The ACL control unit 122 performs the flow control according to the ACL. Specifically, the ACL control unit 122 performs the packet transmission according to the ACL table 200 stored in the ACL storage unit 121.

The memory 130 is a storage device including a Read Only Memory (ROM) and a Random Access Memory (RAM). As illustrated in FIG. 2, the memory 130 functions as an FDB storage unit (second storage unit) 131.

The FDB table 300 is stored in the FDB storage unit 131. In other words, the FDB setting unit 112 of the CPU 11 stores the FDB table 300 in the FDB storage unit 131.

The FDB control unit 132 performs the flow control according to the FDB. Specifically, the FDB control unit 132 performs control of the packet transmission according to the FDB table 300 stored in the FDB storage unit 131.

In the switch 10 according to the embodiment, the ACL setting unit 111, the TCAM 120, and the ACL control unit 122 function as a first packet transmission control unit, and the FDB setting unit 112, the memory 130, and the FDB control unit 132 function as a second packet transmission control unit.

Figure 3:
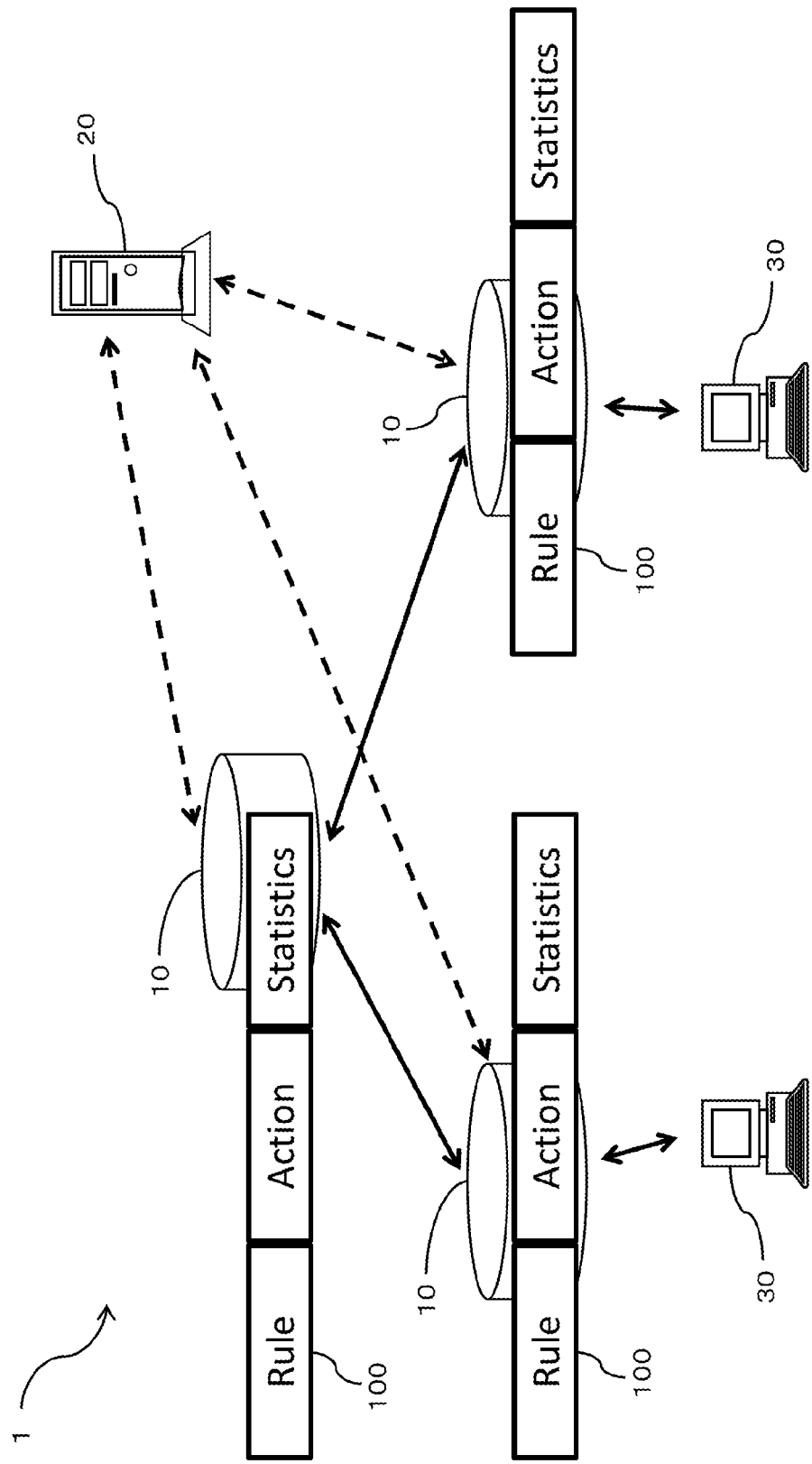
FIG. 3 is a diagram for describing OpenFlow which is used by the network system according to the embodiment.

FIG. 3 is a diagram for describing OpenFlow which is used by the network system according to the embodiment.

The network system 1 according to the embodiment performs network control using the OpenFlow. The network system 1 exemplified in FIG. 3 includes three switches 10, the controller 20, and two server apparatuses 30.

Each server apparatus 30 transfers a packet to another server apparatus 30 through three switches (see bidirectional solid arrows in FIG. 3).

The controller 20 performs management on each switch 10. For example, before the packet transmission between the respective switches 10, the controller 20 sets the flow list 100, for each switch 10, of which the fields of Rule, Action, and Statistics are associated with each other.

The network system 1 can control a multilayer flow (e.g., Layer 2 (L2), Layer 3 (L3), and Layer 4 (L4)) by the settings of the flow list 100 performed by the controller 20, so that the flow management can be uniformly realized.

Figure 4:
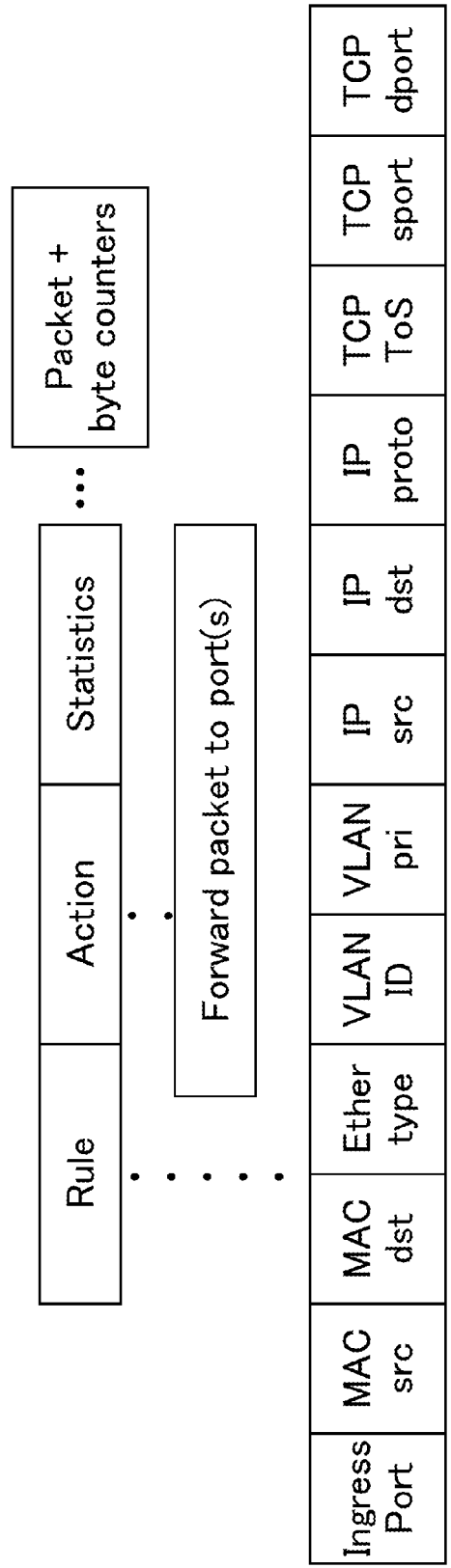
FIG. 4 is a diagram illustrating a flow definition of OpenFlow which is used by the network system according to the embodiment.

FIG. 4 is a diagram illustrating a flow definition of the OpenFlow which is used by the network system according to the embodiment.

The flow definition of the OpenFlow used by the network system 1 includes a 12-Tuples field as a Rule field as illustrated in the drawing. The switch 10 identifies a received packet based on information of each field included in the Rule field.

In an Action field, information of Forward packet to port(s) is included as illustrated in the drawing. The switch 10 processes a packet which is matched to its Rule field (designating a number of the transmission port 15) based on the Action field.

In the Statistics field, information of Packet and byte counters is included as illustrated in the drawing.

Figure 5:
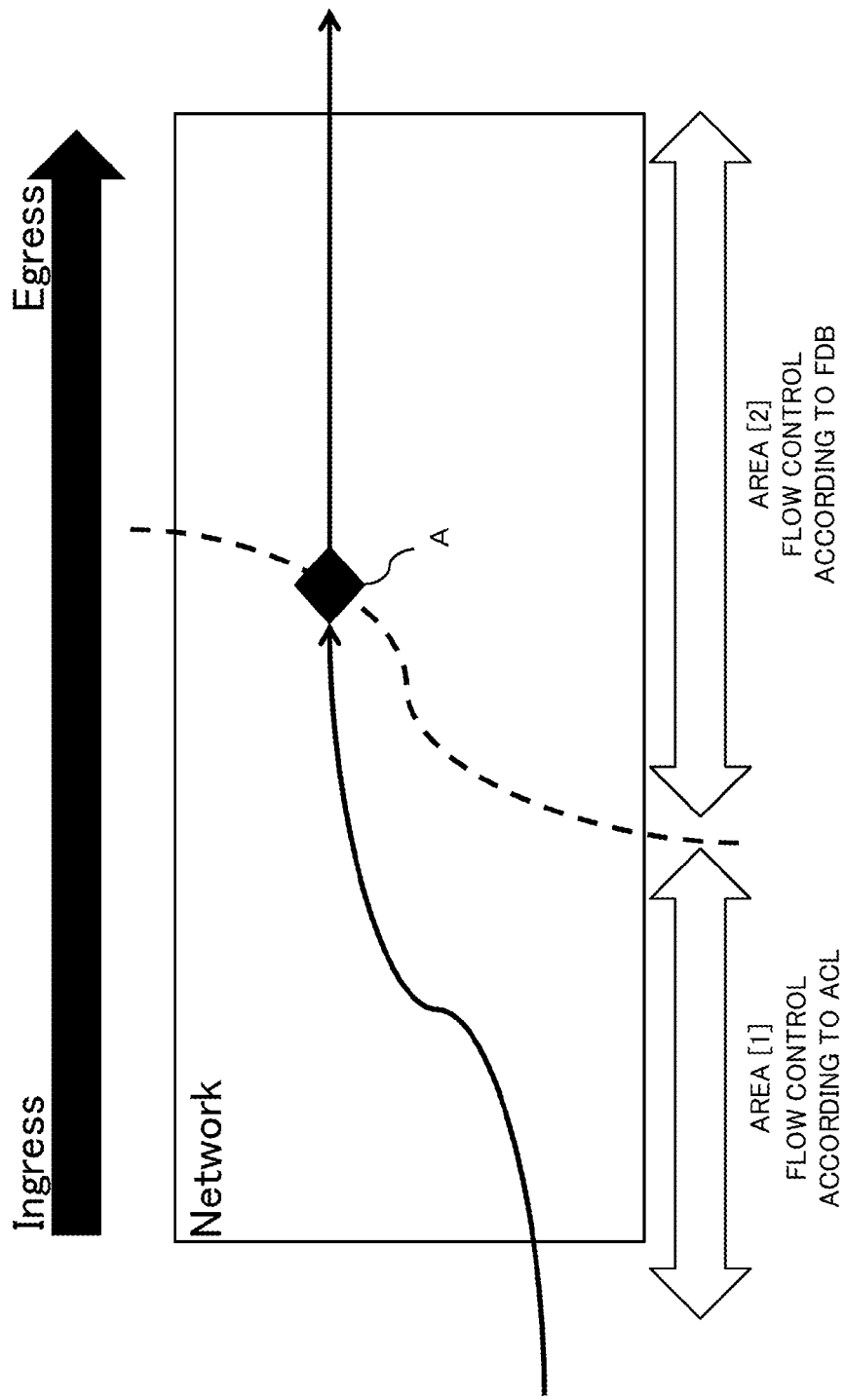
FIG. 5 is a diagram for describing a flow control in the network system according to the embodiment.

FIG. 5 is a diagram for describing a flow control in the network system according to the embodiment.

As illustrated in FIG. 5, the network system 1 in the embodiment divides a packet transmission path into two areas, Area [1] (first packet transmission control area) and Area [2] (second packet transmission control area), to perform packet transmission. Specifically, the network system 1 performs the flow control on Area [1] according to the ACL, and the flow control on Area [2] according to the FDB. In other words, the network system 1 includes the first packet transmission control area according to the first packet transmission control unit and the second packet transmission control area according to the second packet transmission control unit. Further, as illustrated in FIG. 5, Area [1] and Area [2] are partitioned by a turning point A.

Area [1] is an area in which there is no destination in the ports to the server apparatus 30 of the switch 10 and there are a plurality of upstream paths in the packet transmission from the server apparatus 30 toward the turning point A. In other words, Area [1] is an area up to the turning point A in which a path toward the server apparatus 30 at the transmission destination is not uniquely determined among the packet transmission paths from the server apparatus 30 at the transmission source to the server apparatus 30 at the transmission destination.

Area [2] is an area in which there is destination in the port to the server apparatus 30 of the switch 10 and a path is uniquely determined in the packet transmission from the turning point A toward the server apparatus 30. In other words, Area [2] is an area after the turning point A among the packet transmission paths from the server apparatus 30 at the transmission source to the server apparatus 30 at the transmission destination.

Figure 6:
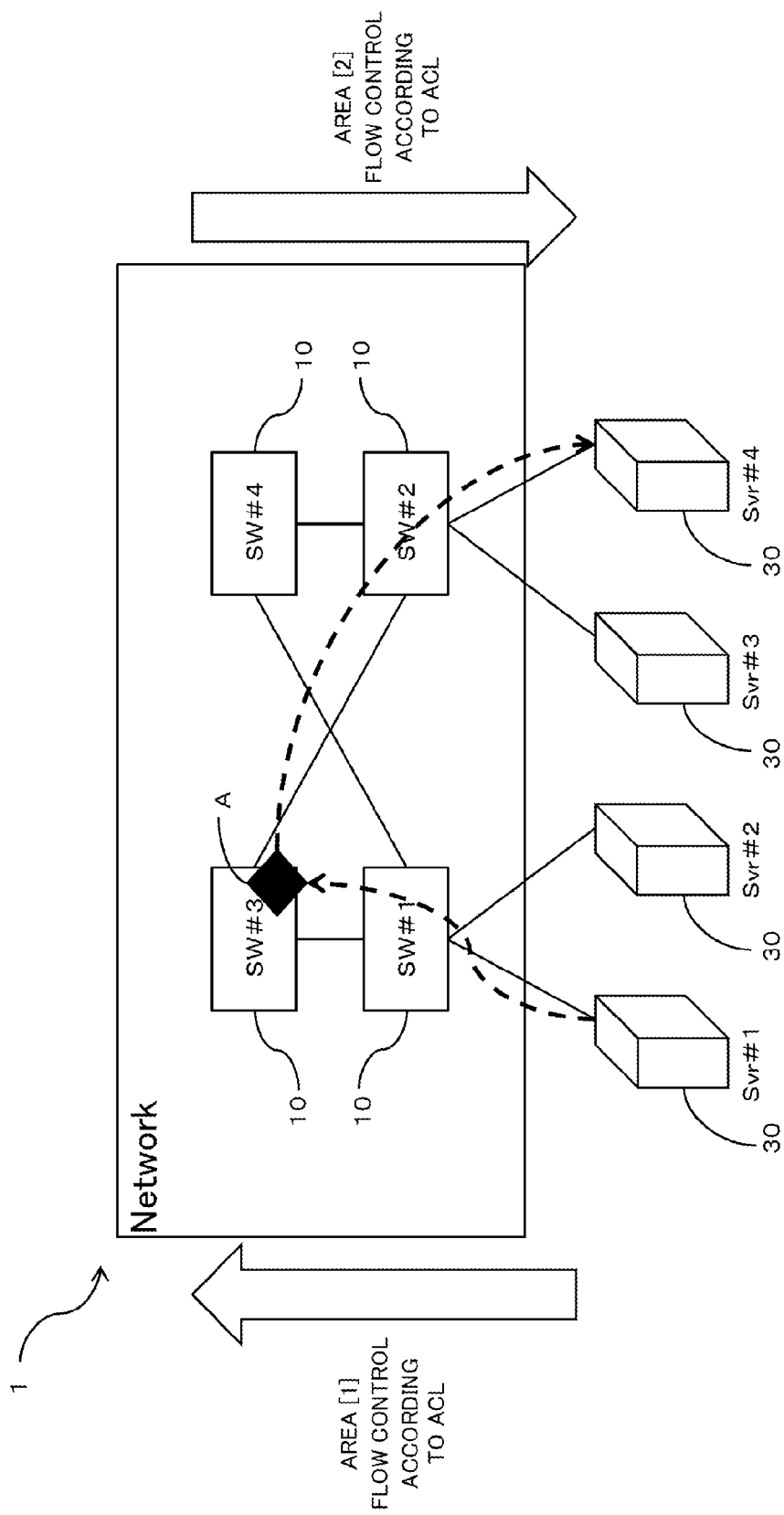
FIG. 6 is a diagram for describing a flow control in the network system according to the embodiment.

FIG. 6 is a diagram for describing a flow control in the network system according to the embodiment.

The network system 1 exemplified in FIG. 6 includes four switches 10 (SW#1 to SW#4), four server apparatuses 30 (Svr#1 to Svr#4), and the controller 20 (not illustrated).

Hereinafter, in the description below with reference to FIG. 6, when a specific switch 10 is indicated, the switch will be denoted with "SW#1", "SW#2", "SW#3", or "SW#4". Further, in the following description with reference to FIG. 6, when a specific server apparatus 30 is indicated, the server apparatus will be denoted with "Svr#1", "Svr#2", "Svr#3", or "Svr#4".

In the example illustrated in FIG. 6, Svr#1 is a device at the transmission source which transmits a packet, and Svr#4 is a device at the transmission destination which receives the packet. Further, in the example illustrated in FIG. 6, the packet transmitted by Svr#1 is transferred to Svr#4 through SW#1, SW#3, and SW#2 (see broken arrows in FIG. 6).

In the example illustrated in FIG. 6, there are two paths through which the packet is transmitted from Svr#1 to Svr#4. In other words, as the path for transferring the packet from Svr#1 to Svr#4, there is a path via SW#4 besides the path via SW#3 illustrated with a broken arrow in the drawing. Further, the path from SW#3 to Svr#4 is uniquely determined, and the path from SW#4 to Svr#4 is also uniquely determined.

In this way, in the transmission path from the device at the transmission source, a switch 10 which can be primally determined unique as a path to the device at the transmission destination is defined as the turning point A in the embodiment (SW#3 in the example illustrated in FIG. 6).

Then, each switch 10 performs the flow control according to the ACL in Area [1] from the device at the transmission source up to the turning point A, and performs the flow control according to the FDB in Area [2] from the turning point A down to the device at the transmission destination. In the example illustrated in FIG. 6, the ACL control unit 122 of SW#1 performs the flow control according to the ACL, and the FDB control units 132 of SW#3 and SW#2 perform the flow control according to the FDB.

In other words, the ACL control unit 122 transfers a packet according to the ACL in Area [1] up to the turning point A where the path to the device at the transmission destination is not uniquely determined among the packet transmission paths from the device at the transmission source to the device at the transmission destination. Further, the FDB control unit 132 transfers the packet according to the FDB in Area [2] after the turning point A among the packet transmission paths from the device at the transmission source to the device at the transmission destination.

The controller 20 (not illustrated in FIG. 6) configures a flow table of each switch 10 which can transfer a packet such that a path up to the turning point A is selectively determined according to the ACL and a path from the turning point A to the device at the transmission destination is decisively determined according to the FDB among the packet transmission paths from the device at the transmission source to the device at the transmission destination.

Figures 7A, 7B:
FIG. 7A is a diagram illustrating a Rule field of the flow definition of an ACL base which is used by the network system according to the embodiment.
FIG. 7B is a diagram illustrating an Action field of the flow definition of the ACL base which is used by the network system according to the embodiment.

FIG. 7A is a diagram illustrating a Rule field of the flow definition of an ACL base which is used by the network system according to the embodiment, and FIG. 7B is a diagram illustrating an Action field thereof.

The network system 1 according to the embodiment performs the flow control of the ACL base in Area [1] at the initiative of a Wildcard Matching Table (WMT) used in matching a wildcard (details will be described below using FIGS. 9A to 9D).

The WMT is established such that the controller 20 controls the switch 10 in a proactive rule mode (proactive setting). For example, the transmission unit 211 of the controller 20 performs the proactive setting when the network system 1 starts up or when topology information is changed. Further, the change of the topology information may be dynamically detected, and may be detected by an operator's manipulation.

A method of identifying the flow depends on an application of a network. For example, in the case of an the overlay network such as a Virtual eXtensible Local Area Network (VXLAN) and a Stateless Transport Tunneling (STT), the flow is identified by focusing on L4 sport of the Rule field illustrated in FIG. 7A. Further, the flow is identified by focusing on an Internet Protocol (IP) address in the case of tenant separation (multitenant), a Virtual Local Area Network (VLAN) in the case of an End-Host Mode (EHM), a Multi-Protocol Label Switching (MPLS) label in the case of an MPLS, and the like.

The network system 1 according to the embodiment selects a focusing field for every application of the network, and determines a path toward the turning point A based on the value of the focusing field. For example, as illustrated in the Action field of FIG. 7B, in the overlay network, a port (path) to transfer a packet is selected based on an L4 TCP/UDP src port.

Further, the network system 1 according to the embodiment can be reduced in number of redundant entries of the ACL by applying a mask value corresponding to the number of paths to the focusing field as illustrated below using FIGS. 9A to 9D.

FIG. 8A is a diagram illustrating a Rule field of the flow definition of an FDB base which is used by the network system according to the embodiment, and FIG. 8B is a diagram illustrating an Action field thereof.

The network system 1 according to the embodiment performs the flow control of the FDB base in Area [2] at the initiative of an Exact Matching Table (EMT) used in Exact matching (destination specification).

The EMT is established such that the controller 20 controls the switch 10 in a proactive rule mode (proactive setting). The proactive setting of the controller 20 is performed at the same timing as the establishing of the WMT, and may be performed at the time of startup/stop/move of the server apparatus 30 or a VM which is deployed by the server apparatus 30. Likewise, in the method of establishing the EMT based on the setting of the controller 20, all of Unicast, Multicast, and Broadcast of the network system 1 become targets.

The establishing of the EMT is not limited to the method of establishing the EMT based on the setting of the controller 20 described above. For example, a hard learning method of the switch 10 may be used, and a hybrid method combining the method of establishing the EMT based on the setting of the controller 20 and the hard learning method of the switch 10 may be used. In the hard learning method, a switch is necessarily configured only to learn a packet from a server toward the turning point A (a path from the turning point A to a server) in order to avoid looping and to prevent conflict with forwarding at the initiative of the WMT, and controls that a learning packet is sent out of the server. Further, in the hybrid method, only the switch directly connected to the server is set by the controller 20, and an upstream switch is automatically learned. Therefore, the algorithm for establishing the EMT of the controller 20 can be simplified, and the server control necessary for the hard learning can be excluded.

As illustrated in FIGS. 8A and 8B, the network system 1 according to the embodiment uniquely determines an output destination using MAC dst or IP dst based on an FDB (a Media Access Control (MAC) table, a static IP routing table). In other words, among the plurality of switches, a switch included in the second packet transmission control area performs retrieving to find out that destination information of an input packet corresponds to any one of a plurality of pieces of second rule information 300, and transfers the input packet according to the corresponding second rule information 300. In the example illustrated in FIG. 8B, the Exact matching is performed based on MAC dst, but the embodiment is not limited thereto. For example, the matching may be performed based on a combination of MAC dst and VLAN ID or a combination of IP dst and VLAN ID. In the Exact matching, a bit mask is not applied to MAC dst, IP dst, and VLAN ID.

The network system 1 according to the embodiment is configured such that the retrieving result of the EMT takes priority over that of the WMT in the retrieving of the flow table for determining a destination of the input packet. That is, only in a case where there is no destination in retrieving of the EMT (DLF: Destination Lookup Failure), the retrieving result of the WMT is performed. In other words, in a case where the second rule information 300 corresponding to the destination of the input packet is stored in the second storage unit 131, the second packet transmission control unit controls the transfer of the input packet according to the second rule information 300. Further, in a case where the second rule information 300 corresponding to the destination of the input packet is not stored in the second storage unit 131, the first packet transmission control unit controls the transfer of the input packet according to the first rule information 200 corresponding to the input packet.

As described above, the setting of the EMT and the WMT is performed in the proactive rule mode (proactive setting). However, in a case where the retrieving of both the EMT and the WMT is failed, the switch 10 may be set in a reactive mode by inquiring of the controller 20 (reactive setting).

FIGS. 9A to 9D are diagrams illustrating an exemplary matching of the flow control of the ACL base in the network system according to the embodiment.

In FIGS. 9A to 9D, the field of Ingress Port among input data Data is for reception port information which is added in the switch 10 at the time of reception. Further, in the matching between the input data and a rule in the ACL control unit 122, the field of Ingress Port, for example, can be matched to a plurality of input ports which are designated in a port vector format. In the port vector format of data, a bit number corresponds to a port number, and is used to identify whether a port of which the bit number corresponds to 0 or 1 is designated. Since a bit width of the port vector depends on the number of ports included in the switch 10 and varies depending on the types of switch devices, it will not be specified herein.

The ACL control unit 122 applies a mask to a predetermined field of the header information of the input packet, performs table retrieving based on the masked packet data, and performs a predetermined operation such as determination/transfer of the output port on the packet according to the retrieving result.

The ACL control unit 122 takes a bit logical product between data in the field (Data) illustrated in FIG. 9A and a bit mask value (Bit Mask Value) illustrated in FIG. 9B (see arrow B1) to obtain data after masking (Data after masking) illustrated in FIG. 9C (see arrow B2). Further, the ACL control unit 122 performs matching between the data after masking of L4 sport and rules illustrated in FIG. 9D (see arrow B3).

The symbol "*" in FIG. 9D means a wildcard. Further, the wildcard represents Don't Care at the time of retrieving, a field designated with a wildcard of the TCAM 120 is set to an appropriate comparison value. In the embodiment, the field designated with a wildcard can also be used to make the flow identification and control more detailed.

The ACL control unit 122 maps L4 sport to 0 or 1 by masking L4 sport with 0x0001, and determines which one of two rules is matched. In the example illustrated in FIGS. 9A to 9D, since the data after masking of L4 sport is 1, the ACL control unit 122 determines that the L4 sport is matched to Rule2 (see arrow B4).

At this time, the number of rules registered in the ACL is determined according to the mask value, but the mask value is determined according to the number of paths to the upstream switch toward the turning point A. In other words, the number of necessary rules is determined according to the number of paths from the switch 10 toward the turning point A. FIGS. 9A to 9D illustrate an example in a case where there are two paths, the mask value is 0x0001, and the number of rules is two. In a case where the number of paths is four, the mask value becomes 0x0003, and the number of rules becomes four.

In the case of Ingress Port, when the result of taking the bit logical product between the data after masking and the rules is a value other than 0, the ACL control unit 122 determines that Ingress Port is matched. The other fields except Ingress Port are determined that they are matched in a case where all of them are exactly matched (e.g., the result of exclusive OR is 0). Further, in a case where all fields are matched except the fields of Don't Care, the ACL control unit 122 determines that the data and the rule are matched.

Then, the ACL control unit 122 performs a predetermined control (such as outputting to a designated transmission port 15 or discard) on the input packet by a hard wired circuit (not illustrated) according to an action stored in the entry corresponding to the matched rule of the ACL storage unit 121.

In other words, a switch included in the first packet transmission control area among the plurality of switches applies a mask to a predetermined position in the header information of the input packet according to the number of a plurality of pieces of first rule information 200, and performs control on the input packet according to the first rule information 200 selected from the first storage unit 121 based on the header information after masking.

FIGS. 9A to 9D illustrate an example of a mask application and a matching operation in the ACL control unit 122, in which the order of the mask application and the operation (calculation) of the matching verification is not limited to the illustrated method as long as the results are the same.

FIG. 10 is a diagram for describing a VXLAN which is used by the network system according to the embodiment.

The network system 1 exemplified in FIG. 10 includes two switches 10, two server apparatuses 30, and the controller 20 (not illustrated). Further, the network system 1 physically forms an L2/L3 network (Routed IP network) 2, and logically a VXLAN network 3.

As illustrated in FIG. 10, the server apparatus 30, for example, deploys an Application/Operating System (APP/OS) 31 and a VXLAN Terminal End-Point (VTEP) 32 on a CPU (not illustrated).

The VXLAN is a protocol in which a logical Layer-2 network is established on a Layer-3 network by encapsulating frames with a User Datagram Protocol (UDP).

In the VXLAN, a 24-bit identifier called a VXLAN Network Identifier (VNI) is provided in a VXLAN header, so that it is possible to define 16-million overlay networks at maximum.

Further, in the VXLAN, a packet conversion is performed by the VTEP 32 which is an end point at the edge. Specifically, the VTEP 32 operates on a physical server (on a Hypervisor which operates on the server), and performs the packet conversion between the VXLAN and a VM (not illustrated).

In the example illustrated in FIG. 10, the APP/OS 31 transmits the original frame to the VTEP 32 (see arrow C1). The VTEP 32 specifies a VNI from the frame transmitted from the VM, encapsulates the the frame with the VXLAN header including specified VNI, and transmits the encapsulated frame to the L2/L3 network 2 (see arrow C2). The VTEP 32 of the device at the transmission destination specifies a VM at the destination from the VNI and the destination of the original data, deletes the VXLAN header, and transfers the frame to the VM (not illustrated) (see arrow C3).

In this way, in the VXLAN, the communications between VMs are integrated into the communications between VTEPs 32. In other word, the communication between VMs is concealed by encapsulation of VXLAN.

FIG. 11A is a diagram illustrating the outline of a VXLAN packet which is used by the network system according to the embodiment, and FIG. 11B is a diagram illustrating details thereof.

As illustrated in FIG. 11A, the format of the VXLAN packet includes an outer header and an original frame which are transmitted between the VTEPs 32 through the UDP communication.

Further, as illustrated in FIG. 11B, the outer header includes an outer Ethernet (registered trademark) header, an outer IP header, an outer UDP header, and a VXLAN header, and the original flame includes an inner Ethernet (registered trademark) frame.

Figure 12:
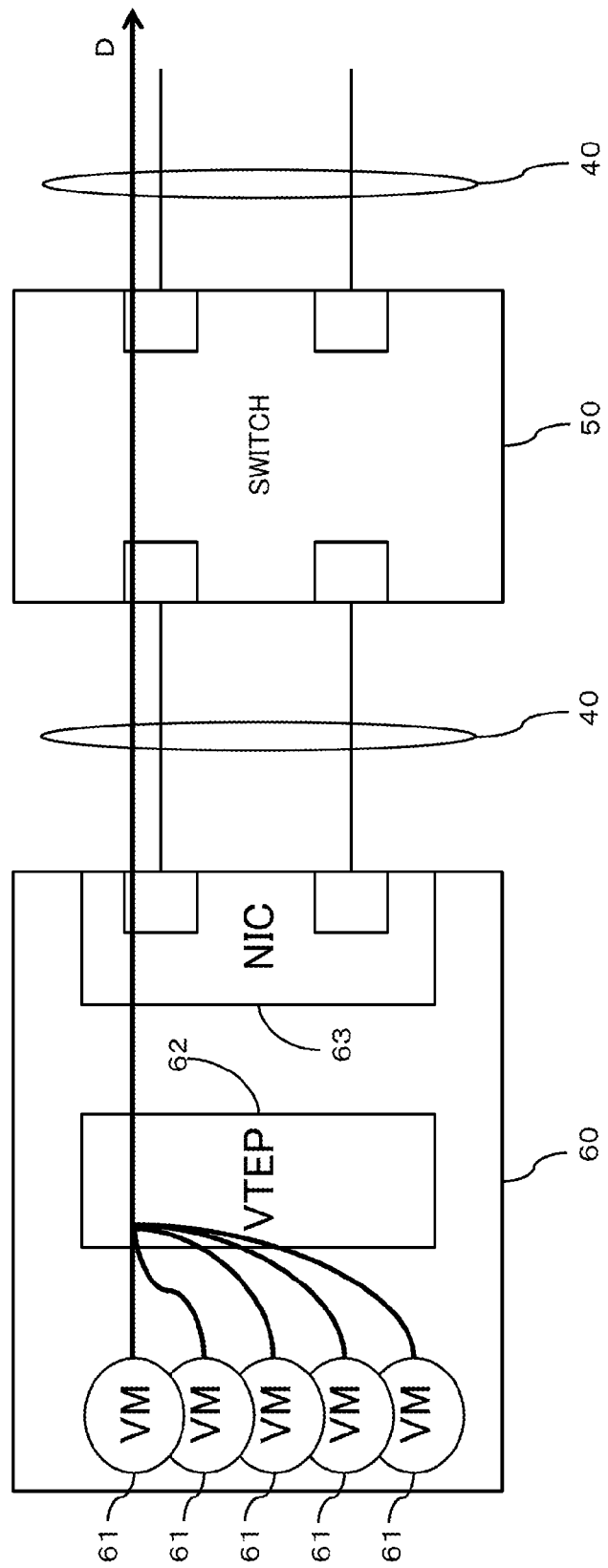
FIG. 12 is a diagram for describing a traffic characteristic of the VXLAN which is used by a network system according to the related art.

FIG. 12 is a diagram for describing a traffic characteristic of the VXLAN which is used by a network system according to the related art.

In the example according to the related art illustrated in FIG. 12, the server apparatus 60 and a switch 50 are communicably connected to each other through a link-aggregation group (LAG) 40. Further, the server apparatus 60 deploys a VTEP 62 and five VMs 61, and includes a network interface card (NIC) 63.

For example, the NIC 63 is a communication adapter which connects the server apparatus 60 to an external network such as a LAN; a LAN card can be exemplified.

In the network system according to the related art in which a distributed algorithm based on an IP/MAC hash is used, as illustrated in FIG. 12, the communications between a plurality (five in the illustrated example) of VMs 61 are integrated into the communication between the VTEPs. Therefore, the number of flows which can be identified on the network is reduced, and thus there is a strong possibility that traffic is unequally distributed. Further, in a multipath transmission control protocol (MPTCP), a multipath is established by changing an L4 src port. However, since the L4 src port of the original data is concealed by the encapsulation of the VXLAN, it is difficult to establish the multipath as expected.

Therefore, in the VXLAN specification used in the network system 1 according to the embodiment, a hash value of a payload is input to the L4 src port.

Figure 13:
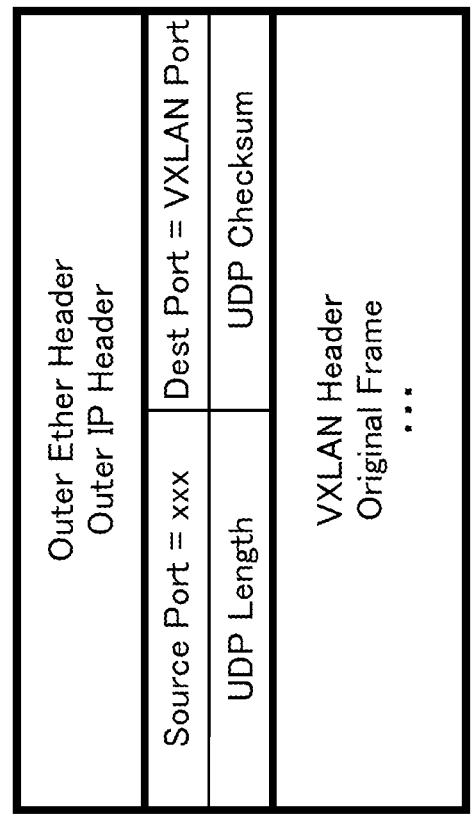
FIG. 13 is a diagram for describing a multipath distribution in the network system according to the embodiment.

FIG. 13 is a diagram for describing a multipath distribution in the network system according to the embodiment.

FIG. 13 illustrates the detail of the outer header in the VXLAN packet used by the network system according to the embodiment illustrated in FIG. 11B.

When the encapsulation is performed, the VTEP 32 of VMware ESXi calculates a hash value with reference to the payload, and stores the calculated hash value in the L4 src port. In other words, the hash value is generated from the content of the frame, and used in a UDP source port of the outer header. The reference place of the payload includes five tuples of IP src, IP dst, IP proto, L4 src, and dst ports.

Figure 14:
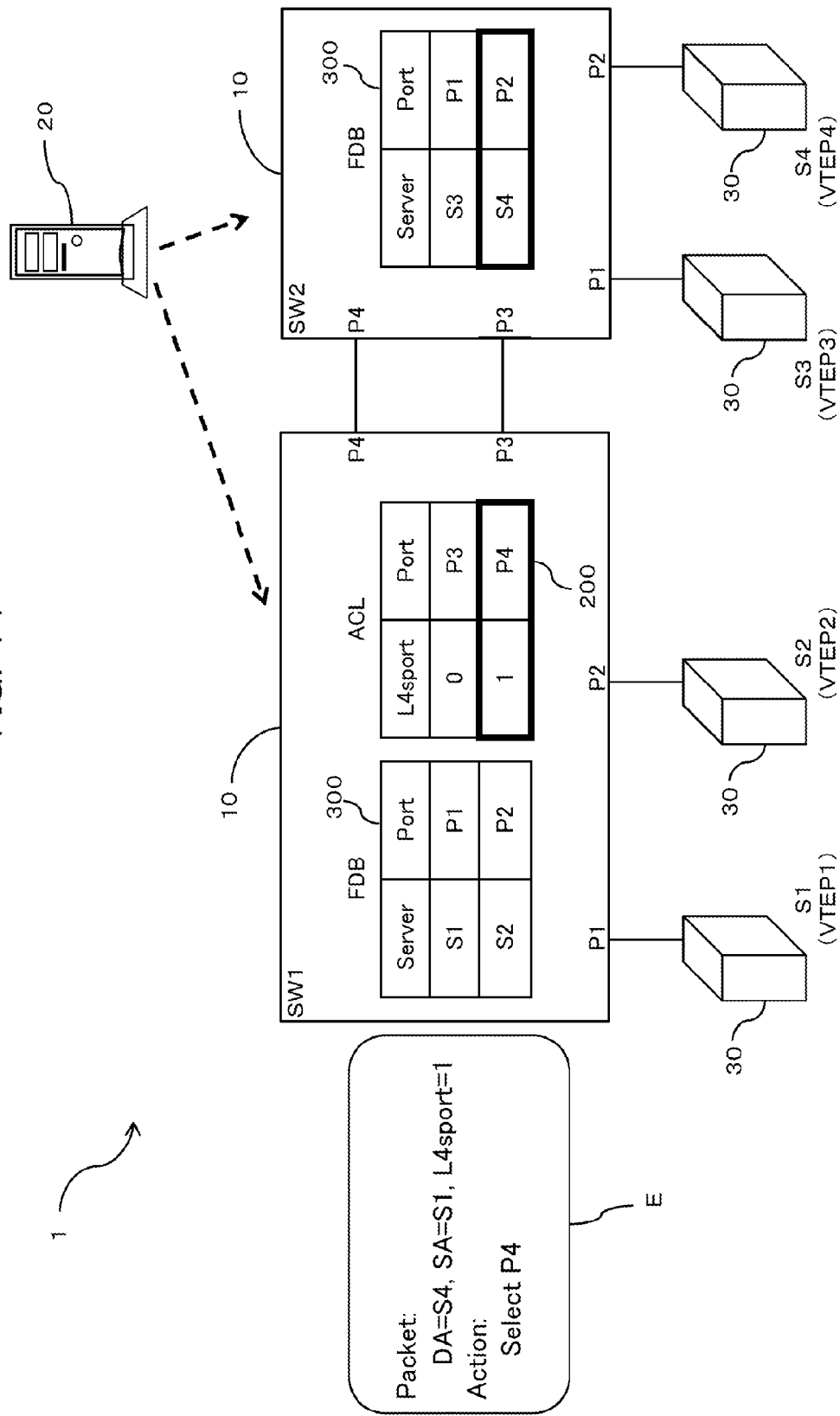
FIG. 14 is a diagram for describing a flow control in a Back to Back structure of the network system according to the embodiment.

FIG. 14 is a diagram for describing a flow control in a Back to Back structure of the network system according to the embodiment.

The network system 1 exemplified in FIG. 14 has the Back to Back structure, and includes two switches 10 (SW1 and SW2), the controller 20, and four server apparatuses 30 (S1 to S4).

Hereinafter, when the description is made with reference to FIG. 14, in a case where a specific switch 10 is indicated, it will be simply denoted with "SW1" or "SW2". Further, in the following, when the description is made with reference to FIG. 14, in a case where a specific server apparatus 30 is indicated, it will be simply denoted with "S1", "S2", "S3", or "S4". Further, while not illustrated in FIG. 14 for simplicity, it is assumed that the value of L4 sport used in retrieving the ACL is masked with a mask value of 0x0001.

First, the transmission unit 211 of the controller 20 sets (transmits) the entries (the FDB table 300 and the ACL table 200) of the FDB and the ACL to each switch 10 in a proactive manner (previously). Specifically, the transmission unit 211 causes the FDB storage unit 131 of the memory 130 to store the FDB table 300, and the ACL storage unit 121 of the TCAM 120 to store the ACL table 200. The transmission unit 211 also sets the ACL table 200 for SW2 while not illustrated in FIG. 14 for simplicity.

In FIG. 14, an example of transferring a packet from S1 to S4 will be described.

As denoted with Symbol E, Destination Address (DA; an address of the transmission destination), Source Address (SA; an address of the transmission source), and L4 sport of the packet (Packet) are set to S4, S1, and 1, respectively.

The FDB control unit 132 of SW1 refers to the FDB table 300, and verifies whether an action in the case of DA=S4 is stored. Herein, since S4 is not stored in the FDB flow table 300 of SW1, the ACL control unit 122 of SW1 refers to the ACL table 200 and verifies the action in the case of L4 sport=1. In this case, since Port=P4 for L4 sport=1 is stored in the ACL table 200 of SW1, the ACL control unit 122 of SW1 selects a P4 port as an action (Action) as denoted with Symbol E. In other words, the ACL control unit 122 transfers a packet to SW2 through P4 port of SW1.

The FDB control unit 132 of SW2 refers to the FDB table 300, and verifies whether an action in the case of DA=S4 is stored. Herein, since Port=P2 for Server=S4 is stored in the FDB table 300 of SW2, the FDB control unit 132 outputs a packet from P2 port as an action. In other words, the FDB control unit 132 transfers a packet to S4 through P2 port of SW2.

In the example illustrated in FIG. 14, SW2 which performs the flow control of the FDB base at the beginning becomes the turning point A.

FIG. 15 is a diagram for describing a flow control in a Fat Tree structure of the network system according to the embodiment.

The network system 1 exemplified in FIG. 15 becomes the Fat Tree structure, and includes four switches 10 (SW1 to SW4), the controller 20, and four server apparatuses 30 (S1 to S4). Further, while not illustrated in FIG. 15 for simplicity, it is assumed that the value of L4 sport used in retrieving the ACL is masked with a mask value of 0x0001.

Hereinafter, when the description is made with reference to FIG. 15, in a case where a specific switch 10 is indicated, it will be simply denoted with "SW1", "SW2", "SW3", or "SW4". Further, in the following, when the description is made with reference to FIG. 15, in a case where a specific server apparatus 30 is indicated, it will be simply denoted with "S1", "S2", "S3", or "S4".

First, the transmission unit 211 of the controller 20 sets (transmits) the entries (the FDB table 300 and the ACL table 200) of the FDB and the ACL for each switch 10 in a proactive manner (previously). Specifically, the transmission unit 211 causes the FDB storage unit 131 of the memory 130 to store the FDB table 300, and the ACL storage unit 121 of the TCAM 120 to store the ACL table 200. While not illustrating the ACL tables 200 of SW3 and SW4 in FIG. 15, the setting unit 112 may set the ACL table 200 even for SW3 and SW4.

In FIG. 15, first an example in which S1 transfers packet #1 to S2 will be described, and then an example in which S1 transfers packet #2 to S3 will be described.

As denoted with Symbol F1, DA, SA, and L4 sport of packet #1 are set to S2, S1, and 0, respectively.

The FDB control unit 132 of SW1 refers to the FDB table 300, and verifies whether an action in the case of DA=S2 is stored. Herein, since Port=P2 for Server=S2 is stored in the FDB table 300 of SW1, the FDB control unit 132 outputs a packet from P2 port as an action. In other words, the FDB control unit 132 transfers a packet to S2 through P2 port of SW1.

In an example of transferring packet #1 illustrated in FIG. 15, SW1 which performs the flow control of the FDB base at the beginning becomes the turning point A.

Next, an example in which S1 transfers packet #2 to S3 will be described.

As denoted with Symbol F2, DA, SA, and L4 sport of packet #2 are set to S3, S1, and 0, respectively.

The FDB control unit 132 of SW1 refers to the FDB table 300, and verifies whether an action in the case of DA=S3 is stored. Herein, since S3 is not stored in the FDB flow table 300 of SW1, the ACL control unit 122 of SW1 refers to the ACL table 200 and verifies the action in the case of L4 sport=0. In this case, since Port=P3 for L4 sport=0 is stored in the ACL table 200 of SW1, the ACL control unit 122 of SW1 selects P3 port as an action as denoted with Symbol F2. In other words, the ACL control unit 122 transfers a packet to SW3 through P3 port of SW1.

The FDB control unit 132 of SW3 refers to the FDB table 300, and verifies whether an action in the case of DA=S3 is stored. Herein, since Port=P2 for Server=S3 is stored in the FDB table 300 of SW3, the FDB control unit 132 outputs a packet from P2 port as an action as denoted with Symbol F3. In other words, the FDB control unit 132 transfers a packet to SW2 through P2 port of SW3.

In the example of transferring packet #2 illustrated in FIG. 15, SW3 which performs the flow control of the FDB base at the beginning becomes the turning point A.

The FDB control unit 132 of SW2 refers to the FDB table 300, and verifies whether an action in the case of DA=S3 is stored. Herein, since Port=P1 for Server=S3 is stored in the FDB table 300 of SW3, the FDB control unit 132 outputs a packet from P1 port as an action. In other words, the FDB control unit 132 transfers a packet to S3 through P1 port of SW2.

In a hash calculating method illustrated in FIG. 16A, a first hash value is calculated from Inner 5-tuple of the payload, and a second hash value to select path is calculated from Outer 5-tuple (IP src, IP dst, IP proto, L4 src, and dst ports) including Outer L4 src port to which the first hash value after encapsulation is set. Since the calculation of the second hash value and the selection of a path are performed by the switch 10, it is difficult to perform detailed control on the path selection based on the second hash value by the controller 20 using the OpenFlow.

In a hash calculating method illustrated in FIG. 16B, the first hash value is calculated from Inner 5-tuple of the payload, and the first hash value is set to Outer L4 src port at the time of encapsulation. The path selection in the switch 10 is performed based on the first hash value after masking.

In a has calculating method illustrated in FIG. 16C, while being substantially equal to that of FIG. 16B, the hash calculation is performed using an VXLAN Network Identifier (VNI) as well as Inner 5-tuple to calculate the first hash value, so that the flow can be identified in detail.

In the hash calculating methods of FIGS. 16B and 16C, the controller 20 performs the setting of the switch 10 using the OpenFlow so as to select a path based on the first hash value after masking. However, at this time, a vendor extension of the OpenFlow is needed as denoted with Symbol G.

[A-2] Operations

Figure 17:
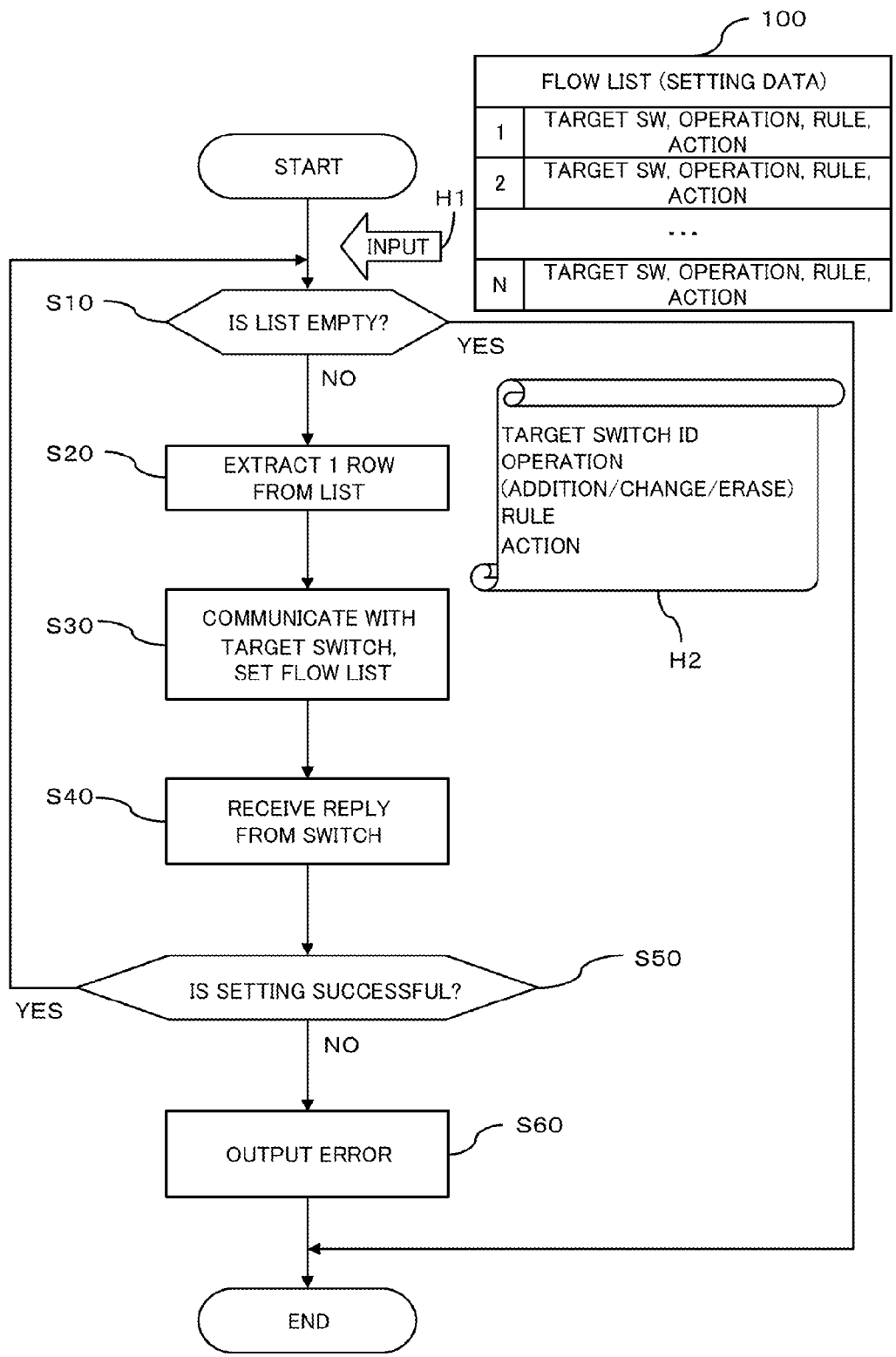
FIG. 17 is a flowchart illustrating a process of setting a flow list in a controller which is provided in the network system according to the embodiment.

A setting process of the flow list 100 in the controller 20 which includes the network system 1 according to the embodiment having the configuration as described above will be described according to a flowchart illustrated in FIG. 17 (Steps S10 to S60).

First, the flow list 100 which is created as described using FIG. 18 below, for example, is input (stored) in the storage device 23 of the controller 20 (see Symbol H1). For example, in the flow list 100 thus input, a target SW indicating a setting target switch 10, an operation instructing addition/delete/change of the flow, a rule which is a matching rule for identifying the flow, and an action indicating an operation in the case of matching are associated with each other.

The transmission unit 211 of the controller 20 determines whether the flow list 100 is empty (Step S10). In other words, the transmission unit 211 determines whether all the content items 1 to N of the flow list 100 illustrated in FIG. 17 are completely set to the target switch 10.

In a case where the flow list 100 is empty (see YES route of Step S10), the setting process of the flow list 100 in the controller 20 is ended.

In a case where the flow list 100 is not emptied (see NO route of Step S10), the transmission unit 211 extracts one row from the flow list 100 (Step S20). For example, the information extracted from the flow list 100 includes an ID of the target switch, an operation (addition/change/delete), a rule, and an action (see Symbol H2).

The transmission unit 211 communicates with the target switch 10, and sets the flow list 100 (Step S30).

The transmission unit 211 receives a reply from the switch 10 (Step S40).

The transmission unit 211 determines whether the setting is successful based on the reply from the switch 10 (Step S50).

In a case where the setting is successful (see YES route of Step S50), the procedure moves to the next row of the flow list 100 and returns to Step S10.

In a case where the setting is not successful (see NO route of Step S50), the transmission unit 211, for example, outputs an error to a display (not illustrated) of the controller 20 (Step S60), and ends the setting process of the flow list 100 in the controller 20.

FIG. 18 is a diagram illustrating an exemplary algorithm which is used in a process of creating the flow list in the network system according to the embodiment.

In the algorithm illustrated in FIG. 18, topology information T is set to be an input, and a flow list L for a proactive setting is output. The topology information T to be input may be statically secured by the controller 20, or may be given by a dynamical detection.

The function, Search Tree(n), receives node information n as an input, and returns a server list S under the node information n. Further, an entry group to be set in the node information n is added to the flow list L.

Flow setting information of each switch 10 can be added to the flow list L for the proactive setting by recursively performing Search Tree(v) on the subtrees from root-node r because it returns node-id of the node information n if the node information n indicates Server (the server apparatus 30).

Figure 19:
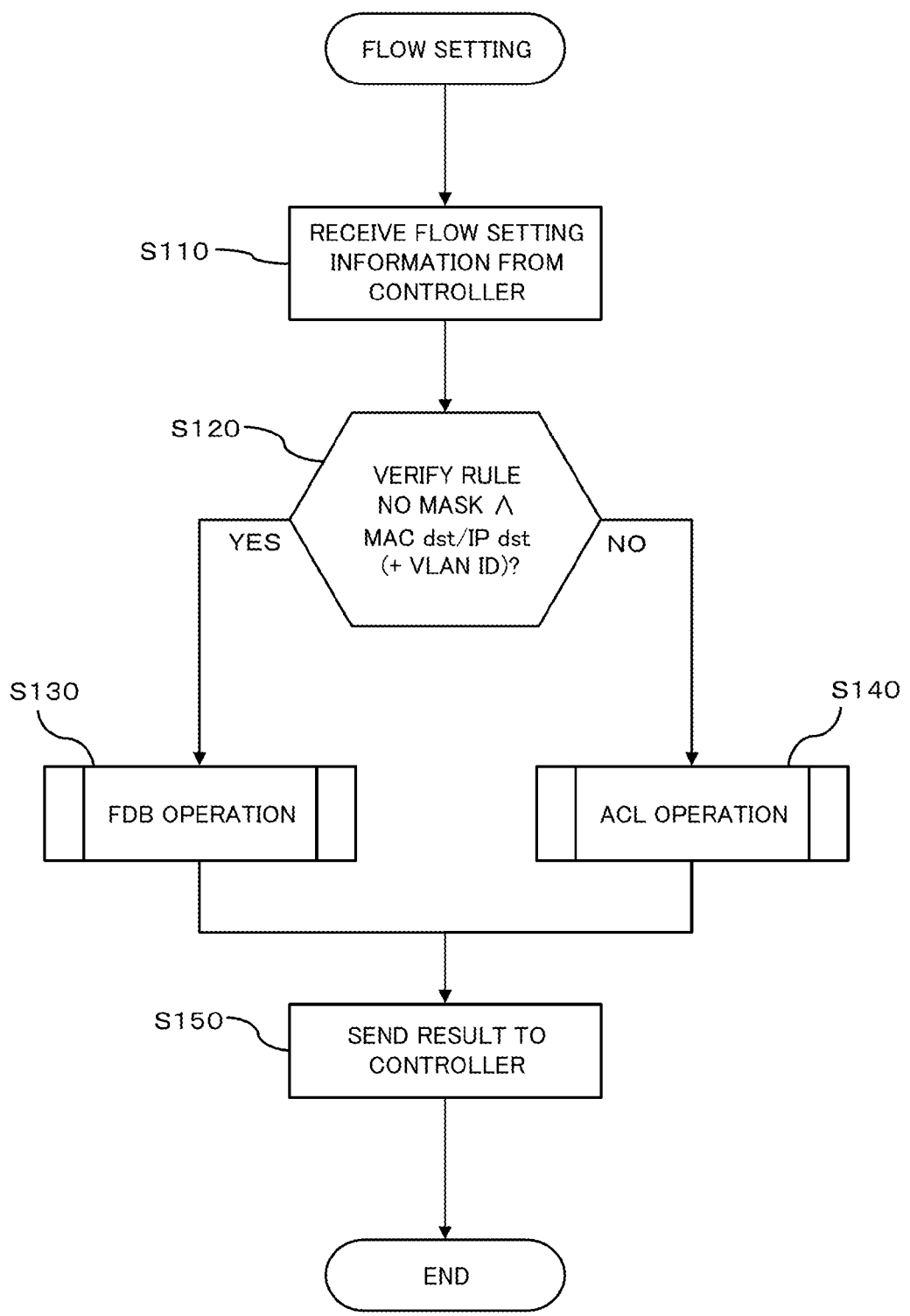
FIG. 19 is a flowchart illustrating a process of setting the flow list in a switch which is provided in the network system according to the embodiment.

Next, the setting process of the flow list 100 in the switch 10 provided in the network system 1 according to the embodiment will be described according to a flowchart illustrated in FIG. 19 (Steps S110 to S150).

The setting unit 110 of the switch 10 receives the flow setting information from the controller 20 (Step S110).

The setting unit 110 verifies the rule of the flow setting information, and determines whether the rule is No mask $\Lambda$ MAC dst/IP dst (+VLAN ID) (Step S120). The determination conditions "$\Lambda$" and "/" in Step S120 represent "AND" and "OR", respectively. Besides MAC dst or IP dst, the determination result becomes YES even when VLAN ID is included.

Figure 21:
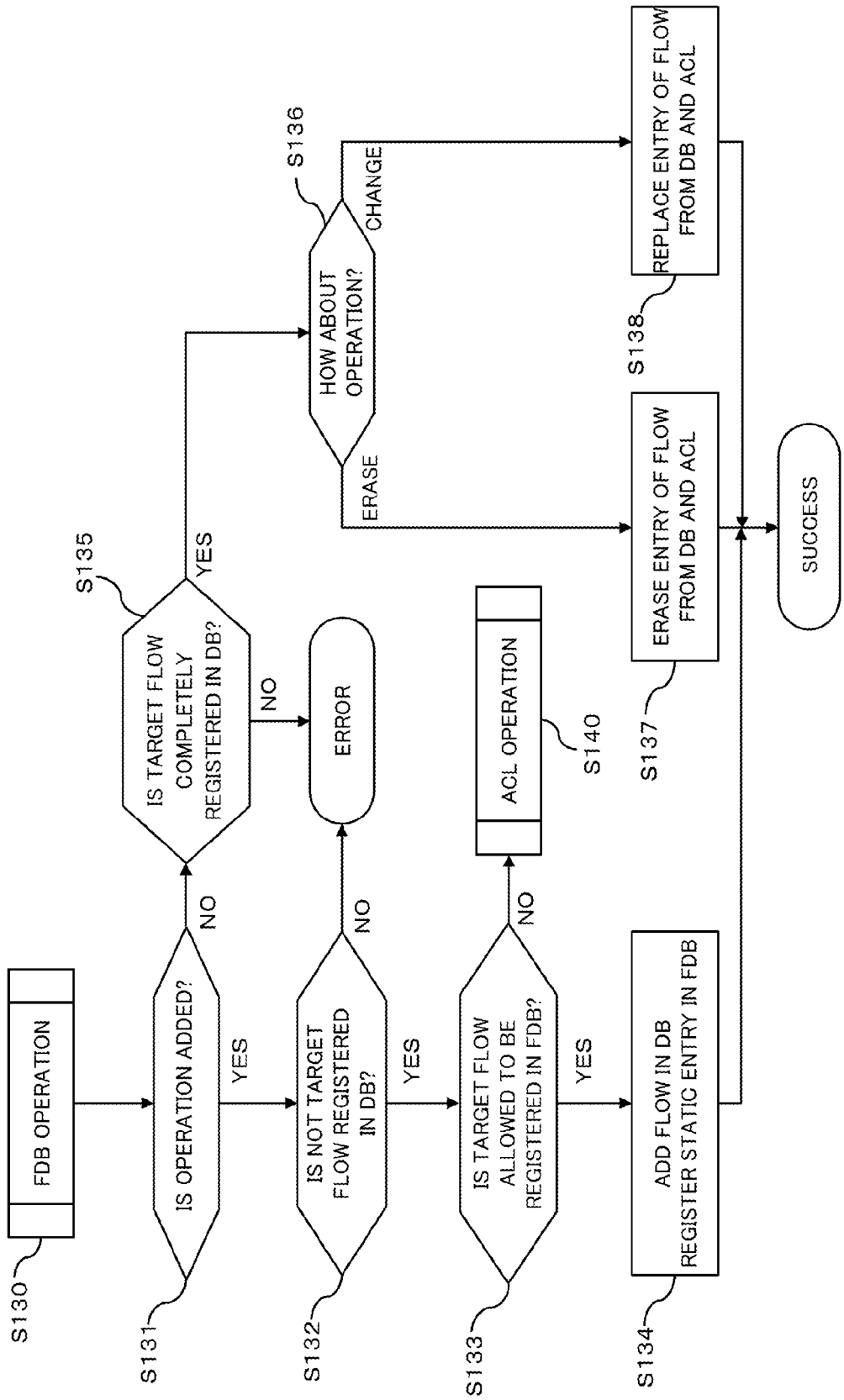
FIG. 21 is a flowchart illustrating a process of setting an FDB table in a switch which is provided in the network system according to the embodiment.

In a case the rule is No mask $\Lambda$ MAC dst/IP dst (+VLAN ID) (see YES route of Step S120), the FDB setting unit 112 performs an FDB operation to be described below using FIG. 21 (Step S130), and the procedure proceeds to Step S150.

In a case where the rule is not No mask $\Lambda$ MAC dst/IP dst (+VLAN ID) (see NO route of Step S120), the ACL setting unit 111 performs an ACL operation to be described below using FIG. 20 (Step S140), and the procedure proceeds to Step S150.

Then, the setting unit 110 returns the setting result to the controller 20 (Step S150), and ends the setting process of the flow list 100 in the switch 10.

Next, the details of the ACL operation illustrated in Step S140 of FIG. 19 will be described according to a flowchart illustrated in FIG. 20 (Steps S141 to S147).

The ACL setting unit 111 determines whether an operation is addition (Step S141).

In a case where the operation is addition (see YES route of Step S141), the ACL setting unit 111 determines whether a target flow unregistered in a database (DB) and there is an empty entry (Step S142).

In a case where the target flow is unregistered in the database and there is an empty entry (see YES route of Step S142), the ACL setting unit 111 adds the flow in the database or adds an entry in the ACL (Step S143), and the ACL operation comes to be successful.

On the other hand, in a case where the target flow is already registered in the database or there is no entry (see NO route of Step S142), the ACL operation comes to be error.

Further, in a case where the operation is not of addition (see NO route of Step S141), the ACL setting unit 111 determines whether the target flow is already registered in the database (Step S144).

In a case where the target flow is already registered in the database (see YES route of Step S144), the ACL setting unit 111 determines whether the operation is delete or change (Step S145).

In a case where the operation is deletion (see delete route of Step S145), the ACL setting unit 111 deletes an entry of the flow from the database and the ACL (Step S146), and the ACL operation comes to be successful.

On the other hand, in a case where the operation is change (see change route of Step S145), the ACL setting unit 111 replaces the flow from the database and the ACL (Step S147), and the ACL operation comes to be successful.

Further, in a case where the target flow is unregistered in the database (see NO route of Step S144), the ACL operation comes to be error.

Next, the details of the FDB operation described in Step S130 of FIG. 19 will be described according to a flowchart illustrated in FIG. 21 (Steps S131 to S138).

The FDB setting unit 112 determines whether an operation is addition (Step S131).

In a case where the operation is addition (see YES route of Step S131), the FDB setting unit 112 determines whether the target flow is unregistered in the database (Step S132).

In a case where the target flow is unregistered in the database (see YES route of Step S132), the FDB setting unit 112 determines whether the target flow can be registered in the FDB (Step S133).

In a case where the target flow can be registered in the database (see YES route of Step S133), the FDB setting unit 112 adds the flow in the database or registers a static entry in the FDB (Step S134), and the FDB operation comes to be successful.

Figure 20:
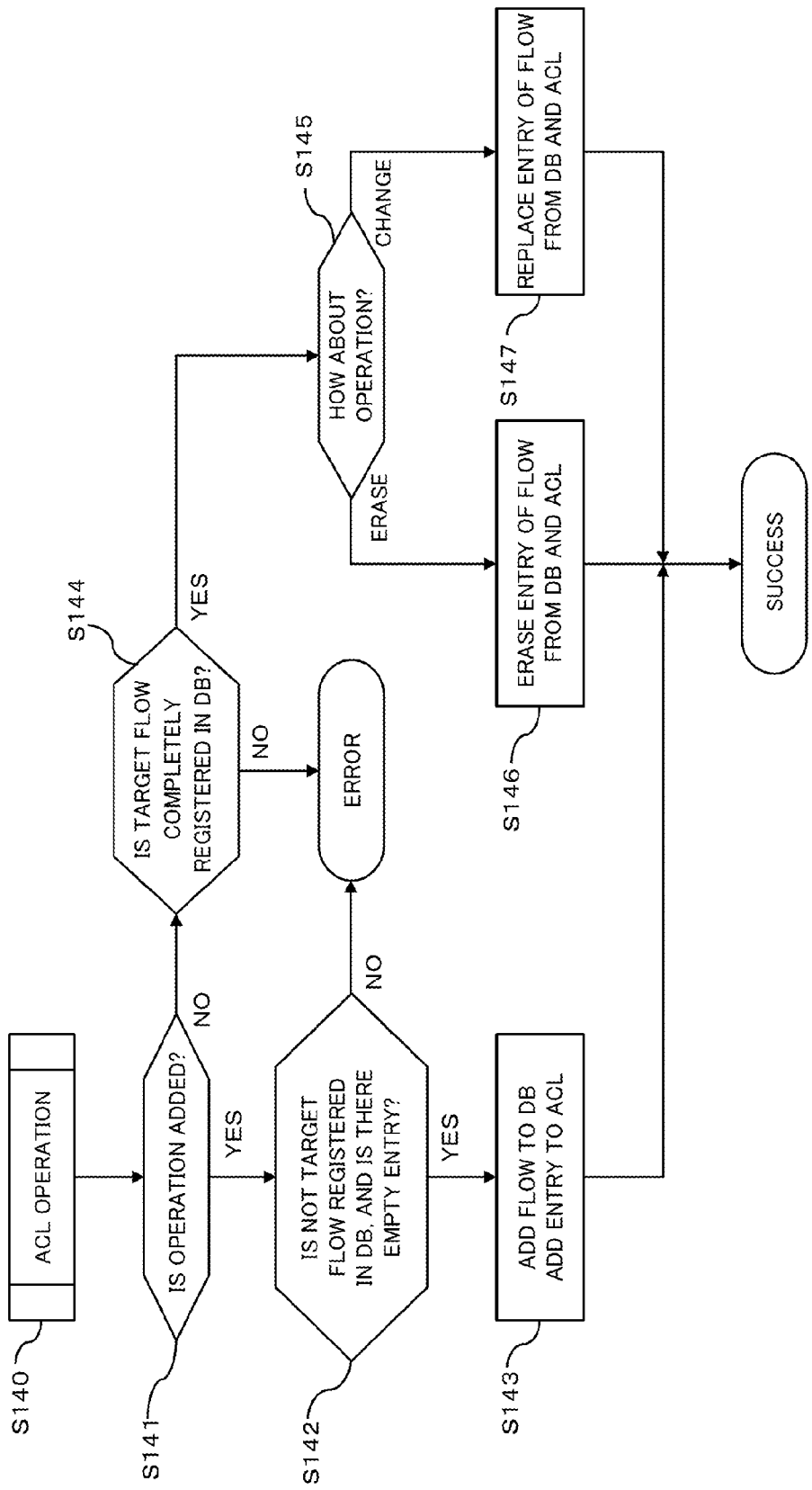
FIG. 20 is a flowchart illustrating a process of setting an ACL table in a switch which is provided in the network system according to the embodiment.

On the other hand, in a case where the target flow cannot be registered in the FDB (see NO route of Step S133), the procedure moves to the ACL operation, and the process described in Step S140 of FIG. 20 is performed.

Further, in a case where the target flow is already registered in the database (see NO route of Step S132), the FDB operation comes to be error.

Further, in a case where the operation is not of addition (see NO route of Step S131), the FDB setting unit 112 determines whether the target flow is already registered in the database (Step S135).

In a case where the target flow is already registered in the database (see YES route of Step S135), the FDB setting unit 112 determines whether the operation is delete or change (Step S136).

In a case where the operation is delete (see delete route of Step S136), the FDB setting unit 112 deletes the entry of the flow from the database and the FDB (Step S137), and the FDB operation comes to be successful.

On the other hand, in a case where the operation is change (see change route of Step S136), the FDB setting unit 112 replaces the entry of the flow from the database and the FDB (Step S138), the FDB operation comes to be successful.

Further, in a case where the target flow is unregistered in the database (see NO route of Step S135), the FDB operation comes to be error.

[A-3] Advantages

Hereinafter, advantages brought by the network system 1 according to the embodiment will be described with reference to FIGS. 22A to 25.

Figure 22A:
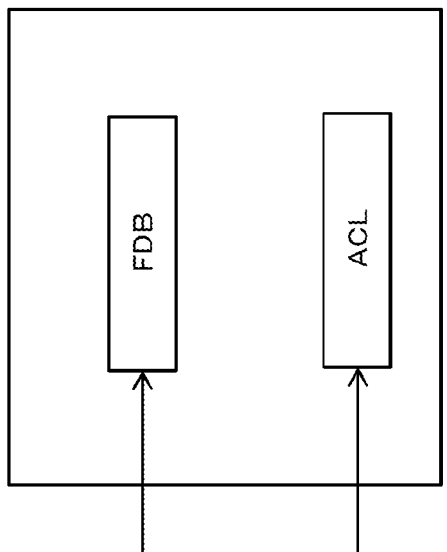
FIGS. 22A and 22B are a diagram schematically illustrating an OpenFlow table and a commodity switch which are used by the network system according to the embodiment.
Figure 22B:
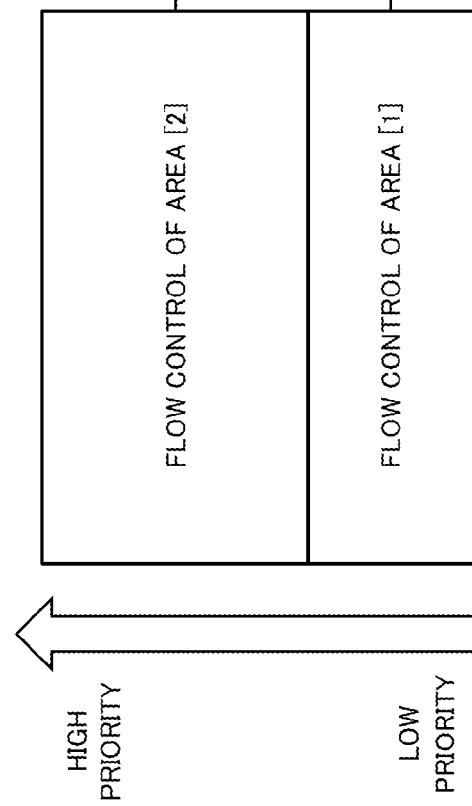

FIG. 22A is a diagram schematically illustrating an OpenFlow table which is used by the network system according to the embodiment, and FIG. 22B is a diagram schematically illustrating a commodity switch thereof.

As illustrated in FIGS. 22A and 22B, the FDB control unit 132 performs the flow control according to the FDB in Area [2] having a high priority, and the ACL control unit 122 performs the flow control according to the ACL modified by Ingress Port in Area [1] having a low priority.

Therefore, in the semantics of OpenFlow 1.0 capable switch, the mapping to hardware utilizing the FDB which occupies a large capacity in the commodity switch can be possible, so that the amount of the used ACL can be reduced.

Figure 23:
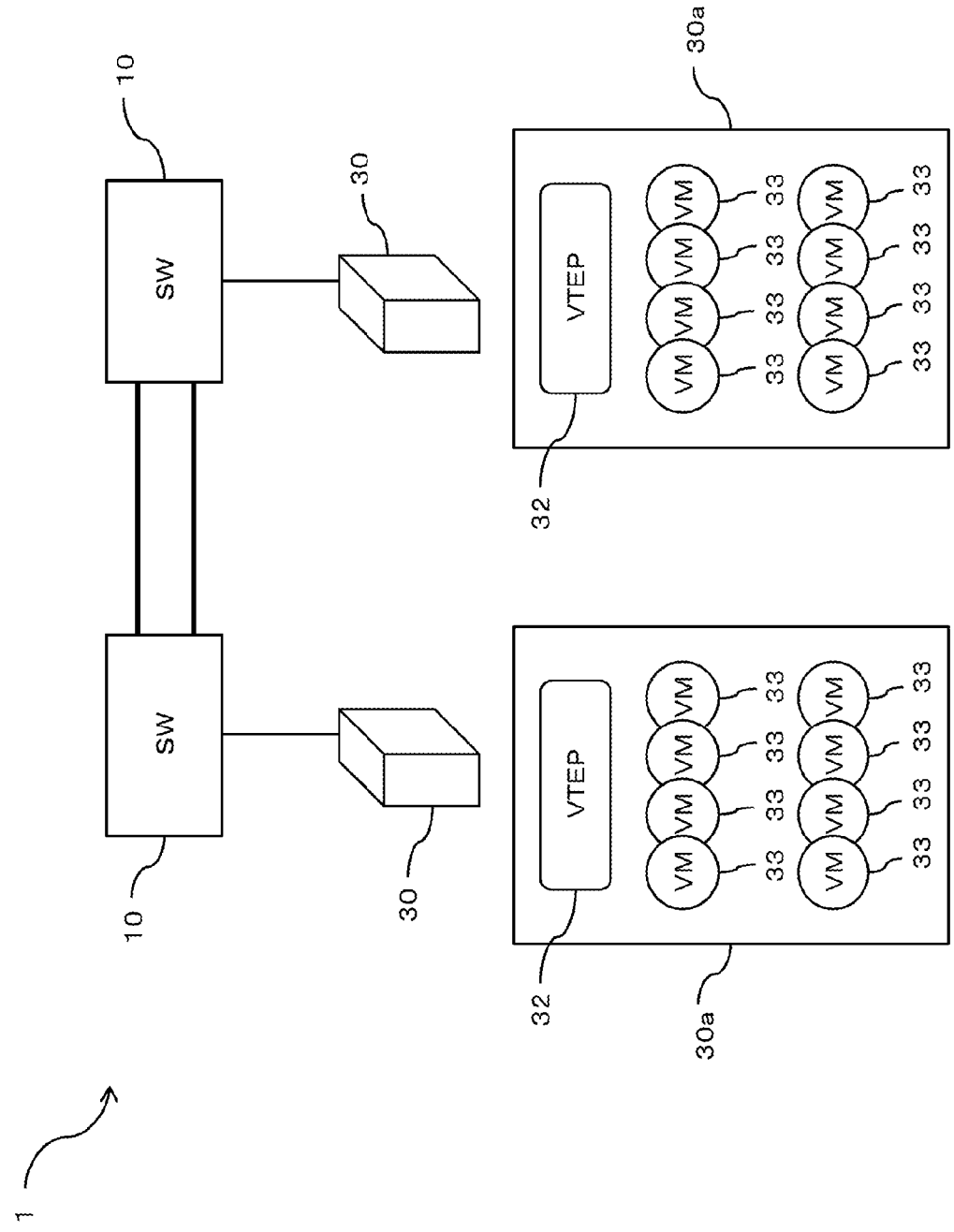
FIG. 23 is a diagram illustrating an exemplary Back to Back structure of the network system according to the embodiment.
Figure 24:
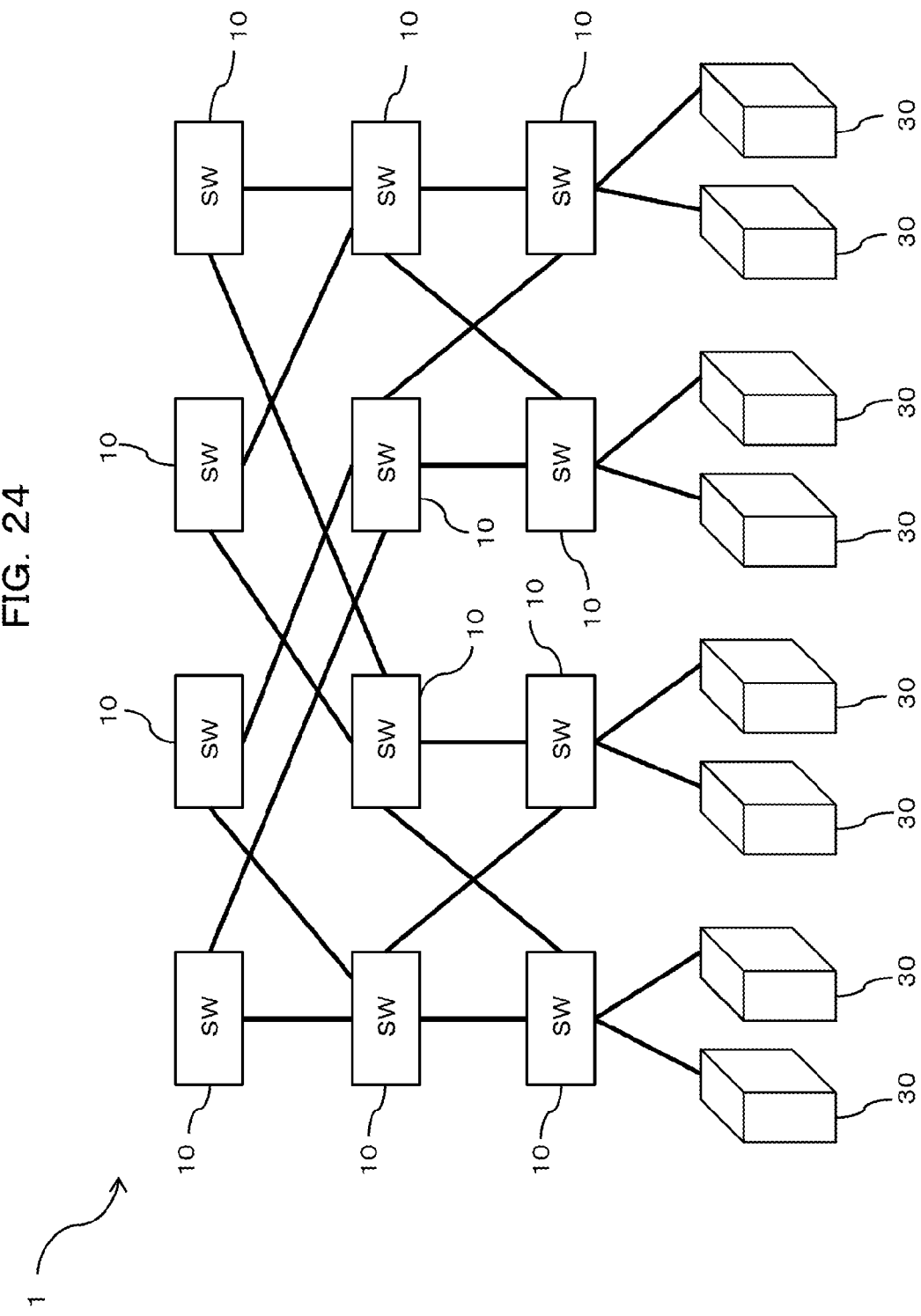
FIG. 24 is a diagram illustrating an exemplary Fat Tree structure of the network system according to the embodiment.

FIG. 23 is a diagram illustrating an exemplary Back to Back structure of the network system according to the embodiment, and FIG. 24 is a diagram illustrating an exemplary Fat Tree structure thereof. Further, FIG. 25 is a diagram illustrating the numbers of use entries which are used in a network system in the related art and in the network system of the embodiment.

The network system 1 illustrated in FIG. 23 is configured in the Back to Back structure, and includes two switches (SWs) 10, two server apparatuses 30, and the controller 20 (not illustrated).

The server apparatus 30 is organized with a virtual environment 30a in which the VTEP 32 and eight VMs 33 are deployed.

As illustrated in FIG. 25, in the Back to Back structure exemplified in FIG. 23, the network system in the related art consumes 128 entries for every one switch as Total #Flow table entries per switch. On the other hand, the network system 1 according to the embodiment consumes 3 entries for every one switch 10 as Total #Flow table entries per switch.

The network system 1 illustrated in FIG. 24 is configured in the Fat Tree structure, and includes 12 switches (SWs) 10, eight server apparatuses 30, and the controller 20 (not illustrated).

The server apparatus 30 is organized with the virtual environment 30a similar to that of the server apparatus 30 illustrated in FIG. 23, in which the VTEP 32 and eight VMs 33 are deployed.

As illustrated in FIG. 25, in the Fat Tree structure exemplified in FIG. 24, the network system in the related art consumes 3584 entries for every one switch as Total #Flow table entries per switch. On the other hand, the network system 1 according to the embodiment consumes 12 entries for every one switch 10 as Total #Flow table entries per switch.

In this way, with the network system 1 according to the embodiment, the number of entries consumed in each switch 10 can be reduced.

Further, the switch 10 applies a mask to a predetermined position of header information of an input packet according to the number of the plurality of pieces of first rule information 200, and to control the input packet according to the first rule information 200 selected from the first storage unit 121 based on the header information after masking. In other words, since the mask value is determined according to the number of connections between each switch 10 and another switch 10 on the upstream side, the number of entries consumed is determined according to the number of connections without relying on the number of VMs or the number of servers. Therefore, it is possible to reduce the number of entries used in each switch 10.

The second packet transmission control unit controls the transfer of the input packet according to the second rule information 300 in a case where the second rule information 300 corresponding to the destination of the input packet is stored in the second storage unit 131. Further, the first packet transmission control unit controls the transfer of the input packet according to the first rule information 200 corresponding to the input packet in a case where the second rule information 300 corresponding to the destination of the input packet is not stored in the second storage unit 131. With this configuration, since the FDB is used from the turning point A to the device at the transmission destination, it is possible to reduce the number of entries which uses the ACL.

[B] MODIFIED EXAMPLES

The disclosed technology is not limited to the above-mentioned embodiment, and various modifications can be implemented in a scope not departing from the spirit of the embodiment. The respective configurations and the respective processes of the embodiment may be chose as needed or may be appropriately combined.

[B-1] First Modified Example

Figure 26:
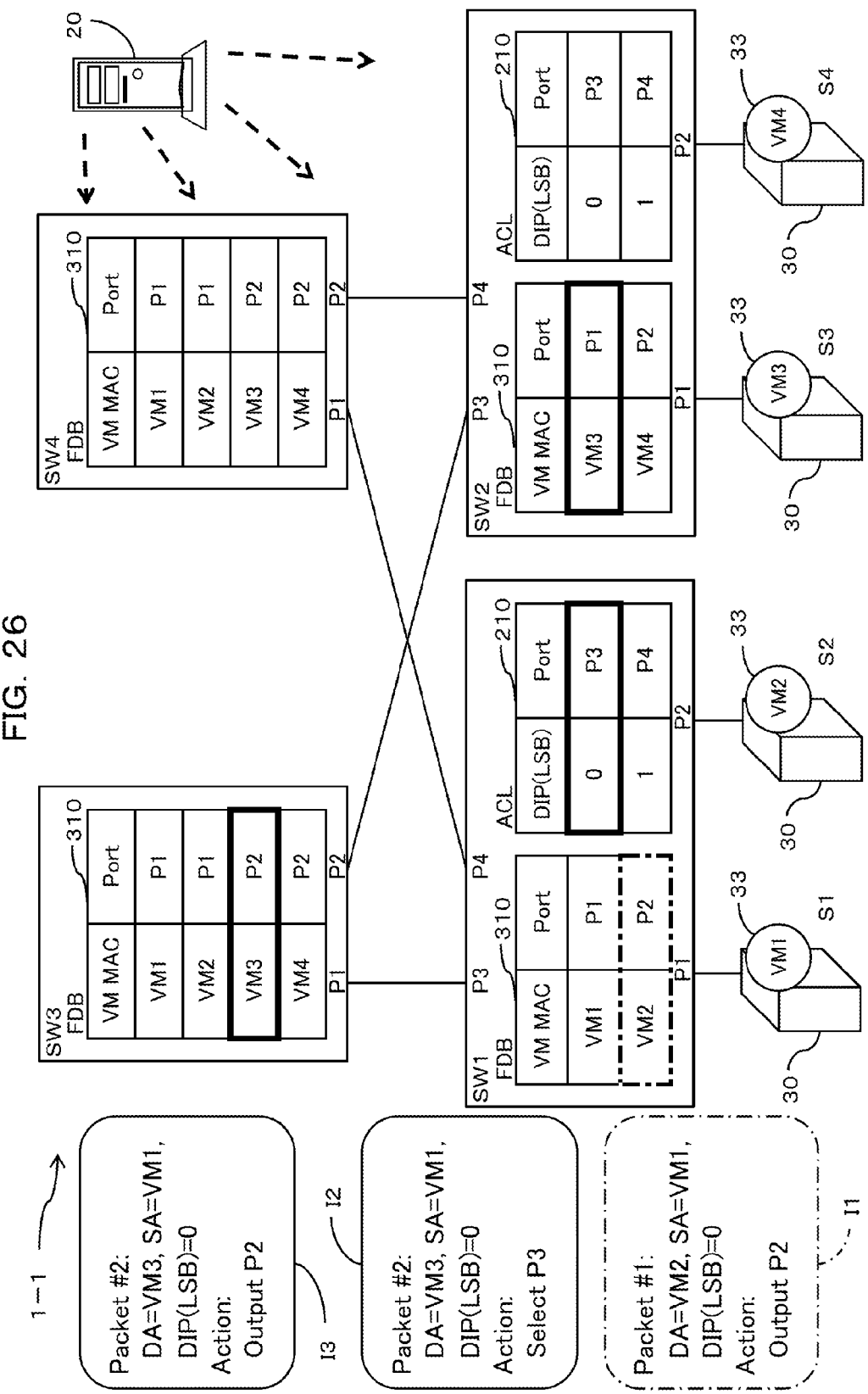
FIG. 26 is a diagram for describing a flow control in a Fat Tree structure of a network system according to a first modified example.

FIG. 26 is a diagram for describing a flow control in a Fat Tree structure of a network system according to a first modified example.

In the embodiment described above, the network system 1 in an overlay environment of the VXLAN has been described, but in the first modified example of the embodiment, a case where a MAC table is used as the FDB without encapsulating the packet will be described.

A network system 1-1 exemplified in FIG. 26 is configured in the Fat Tree structure, and includes four switches 10 (SW1 to SW4), the controller 20, and four server apparatuses 30 (S1 to S4).

Hereinafter, in the description below with reference to FIG. 26, when a specific switch 10 is indicated, the switch will be simply denoted with "SW1", "SW2", "SW3" or "SW4". Further, in the following description with reference FIG. 26, when a specific server apparatus 30 is indicated, the server apparatus will be simply denoted with "S1", "S2", "S3" or "S4". Further, while not illustrated in FIG. 26 for simplicity, it is assumed that the value of DIP(LSB) is obtained as a result of masking DIP with a mask value 0x000000000001. When an ACL retrieval is performed, it is assumed that DIP is masked with the mask value.

As illustrated in FIG. 26, S1 to S4 deploy the VMs 33 (VM1 to VM4), respectively. In the illustrated example, each server apparatus 30 is configured to deploy one VM 33, but the embodiment is not limited thereto. The server apparatus 30 may deploy two VMs 33 or more.

Hereinafter, in the description below with reference to FIG. 26, in a case where a specific VM 33 is indicated, the VM will be simply denoted with "VM1", "VM2", "VM3", or "VM4".

First, the transmission unit 211 of the controller 20 sets (transmits) the entries (the FDB table 310 and the ACL table 210) of the FDB and the ACL to each switch 10 in a proactive manner (previously). Specifically, the transmission unit 211 causes the FDB storage unit 131 of the memory 130 to store the FDB table 310, and the ACL storage unit 121 of the TCAM 120 to store the ACL table 210. While the ACL table 210 of SW3 and SW4 is not illustrated in FIG. 26, the setting unit 112 may set the ACL tables 210 even for SW3 and SW4.

In FIG. 26, an example of transferring packet #1 from VM1 (S1) to VM2 (S2) will be first described, and then an example of transferring packet #2 from VM1 (S1) to VM3 (S3) will be described.

As denoted with Symbol I1, DA, SA, and DIP(LSB) of packet #1 are set to VM2, VM1, and 0 respectively. DIP and LSB represent Destination IP address and Least Small Bit respectively, and DIP(LSB) represents the least significant bit of DIP.

The FDB control unit 132 of SW1 refers to the FDB table 310, and determines whether an action in the case of DA=VM2 is stored. Herein, since Port=P2 for VM MAC=VM2 is stored in the FDB table 310 of SW1, the FDB control unit 132 outputs the packet from port P2 as an action. In other words, the FDB control unit 132 causes the packet to be transferred to VM2 (S2) through port P2 of SW1.

In the example of transferring packet #1 illustrated in FIG. 26, SW1 which performs the flow control of the FDB base at the beginning becomes the turning point A.

Next, an example of transferring packet #2 from VM1 (S1) to VM3 (S3) will be described.

As denoted with Symbol I2, DA, SA, and DIP(LSB) of packet #2 are set to VM3, VM1, and 0 respectively.

The FDB control unit 132 of SW1 refers to the FDB table 310, and verifies whether an action in the case of DA=VM3 is stored. Herein, since VM3 is not stored in the FDB table 310 of SW1, the ACL control unit 122 of SW1 refers to the ACL table 210 and verifies the action in the case of DIP (LSB)=0. In this case, since Port=P3 for DIP(LSB)=0 is stored in the ACL table 210 of SW1, the ACL control unit 122 of SW1 selects P3 port as an action as denoted with Symbol I2. In other words, the ACL control unit 122 transfers a packet to SW3 through P3 port of SW1.

The FDB control unit 132 of SW3 refers to the FDB table 310, and verifies whether an action in the case of DA=VM3 is stored. Herein, since Port=P2 for VM MAC=VM3 is stored in the FDB table 310 of SW3, the FDB control unit 132 outputs a packet from P2 port as an action as denoted with Symbol I3. In other words, the FDB control unit 132 transfers the packet for SW2 through P2 port of SW3.

In the example of transferring packet #2 illustrated in FIG. 26, SW3 which performs the flow control of the FDB base at the beginning becomes the turning point A.

The FDB control unit 132 of SW2 refers to the FDB table 310, and verifies whether an action in the case of DA=VM3 is stored. Herein, since Port=P1 for VM MAC=VM3 is stored in the FDB table 310 of SW3, the FDB control unit 132 outputs a packet from P1 port as an action. In other words, the FDB control unit 132 transfers a packet to S3 through P1 port of SW2.

[B-2] Second Modified Example

Figure 27:
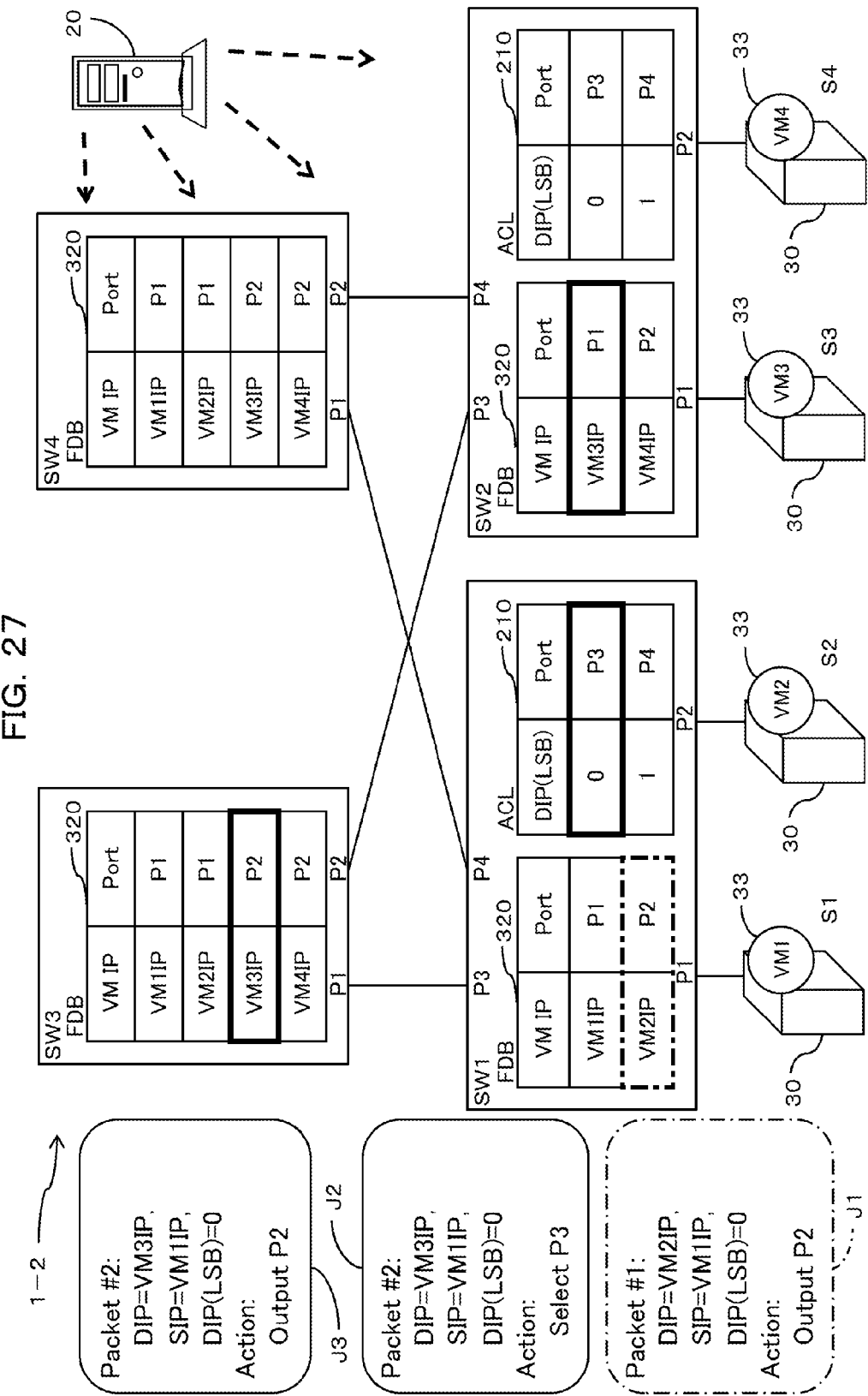
FIG. 27 is a diagram for describing a flow control in a Fat Tree structure of a network system according to a second modified example.
Figure 29:
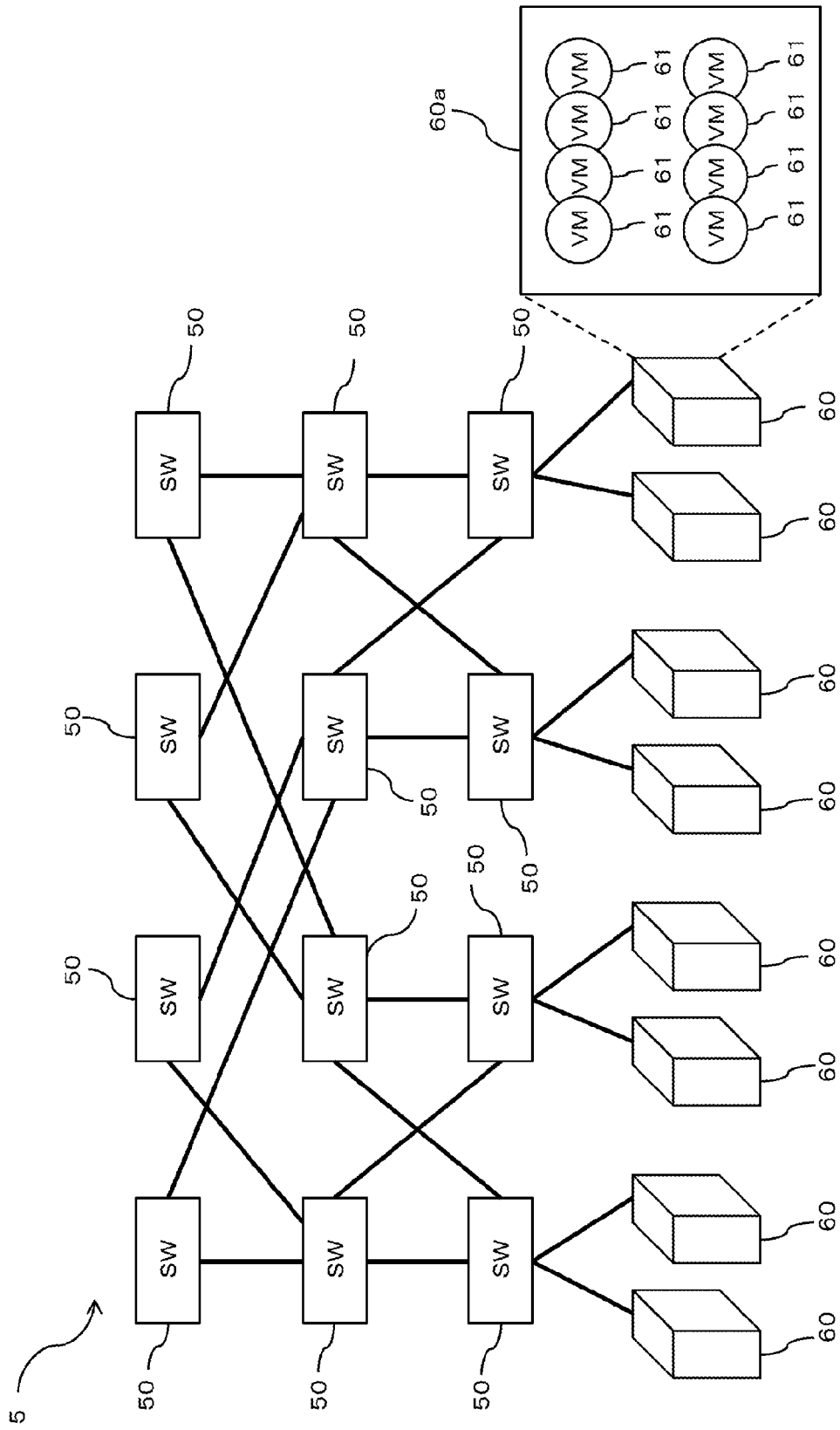
FIG. 29 is a diagram schematically illustrating a configuration of the network system in the related art.

FIG. 27 is a diagram for describing a flow control in a Fat Tree structure of a network system according to a second modified example.

In the embodiment described above, the network system 1 in an overlay environment of the VXLAN has been described, but in the second modified example of the embodiment, a case where a static IP routing table is used as the FDB without encapsulating the packet will be described.

A network system 1-2 exemplified in FIG. 27 is configured in the Fat Tree structure, and includes four switches 10 (SW1 to SW4), the controller 20, and four server apparatuses 30 (S1 to S4).

Hereinafter, in the description below with reference to FIG. 27, when a specific switch 10 is indicated, the switch will be simply denoted with "SW1", "SW2", "SW3" or "SW4". Further, in the following description with reference FIG. 27, when a specific server apparatus 30 is indicated, the server apparatus will be simply denoted with "S1", "S2", "S3" or "S4". Further, while not illustrated in FIG. 27 for simplicity, it is assumed that the value of DIP(LSB) is obtained as a result of masking DIP with a mask value 0x000000000001. When an ACL retrieval is performed, it is assumed that DIP is masked with the mask value.

As illustrated in FIG. 27, S1 to S4 deploy the VMs 33 (VM1 to VM4), respectively. In the illustrated example, each server apparatus 30 is configured to deploy one VM 33, but the embodiment is not limited thereto. The server apparatus 30 may deploy two VMs 33 or more.

Hereinafter, in the description below with reference to FIG. 27, in a case where a specific VM 33 is indicated, the VM will be simply denoted with "VM1", "VM2", "VM3", or "VM4".

First, the transmission unit 211 of the controller 20 sets (transmits) the entries (the FDB table 320 and the ACL table 210) of the FDB and the ACL for each switch 10 in a proactive manner (previously). Specifically, the transmission unit 211 causes the FDB storage unit 131 of the memory 130 to store the FDB table 320, and the ACL storage unit 121 of the TCAM 120 to store the ACL table 210. While the ACL table 210 of SW3 and SW4 is not illustrated in FIG. 27, the setting unit 112 may set the ACL tables 210 even for SW3 and SW4.

In FIG. 27, an example of transferring packet #1 from VM1 (S1) to VM2 (S2) will be first described, and then an example of transferring packet #2 from VM1 (S1) to VM3 (S3) will be described.

As denoted with Symbol J1, DIP, SIP, and DIP(LSB) of packet #1 are set to VM2IP, VM1IP, and 0 respectively. SIP represents a Source IP address.

The FDB control unit 132 of SW1 refers to the FDB table 320, and determines whether an action in the case of DIP=VM2IP is stored. Herein, since Port=P2 for VM IP=VM2IP is stored in the FDB table 320 of SW1, the FDB control unit 132 outputs the packet from port P2 as an action. In other words, the FDB control unit 132 causes the packet to be transferred to VM2 (S2) through port P2 of SW1.

In the example of transferring packet #1 illustrated in FIG. 27, SW1 which performs the flow control of the FDB base at the beginning becomes the turning point A.

Next, an example of transferring packet #2 from VM1 (S1) to VM3 (S3) will be described.

As denoted with Symbol J2, DIP, SIP, and DIP(LSB) of packet #2 are set to VM3IP, VM1IP, and 0 respectively.

The FDB control unit 132 of SW1 refers to the FDB table 320, and verifies whether an action in the case of DIP=VM3IP is stored. Herein, since VM3IP is not stored in the FDB table 320 of SW1, the ACL control unit 122 of SW1 refers to the ACL table 210 and verifies the action in the case of DIP(LSB)=0. In this case, since Port=P3 for DIP(LSB)=0 is stored in the ACL table 210 of SW1, the ACL control unit 122 of SW1 selects P3 port as an action as denoted with Symbol J2. In other words, the ACL control unit 122 transfers a packet to SW3 through P3 port of SW1.

The FDB control unit 132 of SW3 refers to the FDB table 320, and verifies whether an action in the case of DIP=VM3IP is stored. Herein, since Port=P2 for VM IP=VM3IP is stored in the FDB table 320 of SW3, the FDB control unit 132 outputs a packet from P2 port as an action as denoted with Symbol J3. In other words, the FDB control unit 132 transfers the packet for SW2 through P2 port of SW3.

In the example of transferring packet #2 illustrated in FIG. 27, SW3 which performs the flow control of the FDB base at the beginning becomes the turning point A.

The FDB control unit 132 of SW2 refers to the FDB table 320, and verifies whether an action in the case of DIP=VM3IP is stored. Herein, since Port=P1 for VM IP=VM3IP is stored in the FDB table 320 of SW3, the FDB control unit 132 outputs a packet from P1 port as an action. In other words, the FDB control unit 132 transfers a packet to S3 through P1 port of SW2.

[B-3] Advantages

Hereinafter, advantages brought by the network system 1-1 and 1-2 according to the first and second modified examples will be described with reference to FIG. 28.

FIG. 28 is a diagram illustrating the numbers of use entries in the network system in the related art and in the network system of the first and second modified examples.

As illustrated in FIG. 28, in the Back to Back structure exemplified in FIG. 23, the network system in the related art consumes 128 entries for every one switch as Total #Flow table entries per switch. On the other hand, the network systems 1-1 and 1-2 according to the first and second modified examples consume 18 entries for every one switch 10 as Total #Flow table entries per switch.

As illustrated in FIG. 28, in the Fat Tree structure exemplified in FIG. 24, the network system in the related art consumes 3584 entries for every one switch as Total #Flow table entries per switch. On the other hand, the network systems 1-1 and 1-2 according to the first and second modified examples consume 68 entries for every one switch 10 as Total #Flow table entries per switch.

In this way, similarly to the network system 1 according to the embodiment described above, the network systems 1-1 and 1-2 according to the first and second modified examples can also be reduced in number of entries consumed in each switch 10.

According to the network system of the disclosure, it is possible to reduce the number of entries which are used by the switch.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment(s) of the present inventions have been described in detail, it should be understood that the various changes, substitutions, and alterations could be made hereto without departing from the spirit and scope of the invention.

What is claimed is:

1. A network system comprising:
a transmitting/receiving apparatus;
a plurality of switches; and
a network control apparatus,
wherein the switch includes
a first packet transmission control unit, and
a second packet transmission control unit,
wherein the network system includes
a first packet transmission control area that is not uniquely determined a path to the receiving apparatus according to the first packet transmission control unit, and
a second packet transmission control area that is uniquely determined the path to the receiving apparatus according to the second packet transmission control unit, and
wherein a switch which is included in the first packet transmission control area among the plurality of switches is configured
to include, in the first packet transmission control unit, a first storage unit which stores a plurality of pieces of first rule information informed from the network control apparatus, and
to apply a mask to a predetermined position of header information of an input packet according to the number of the plurality of pieces of first rule information, and to control the input packet according to the first rule information selected from the first storage unit based on the header information after masking,
wherein the number of the plurality of pieces of first rule information is determined according to the number of paths from the switch included in the first packet transmission control area toward a switch included in the second packet transmission control area.

2. The network system according to claim 1,
wherein a switch which is included in the second packet transmission control area among the plurality of switches is configured
to include, in the second packet transmission control unit, a second storage unit which stores a plurality of pieces of second rule information informed from the network control apparatus, and
to retrieve one of the plurality of pieces of second rule information which corresponds to destination information of the input packet, and to transfer the input packet according to the corresponding second rule information.

3. The network system according to claim 2,
wherein the second packet transmission control unit controls the transfer of the input packet according to the second rule information in a case where the second rule information corresponding to the destination of the input packet is stored in the second storage unit, and
wherein the first packet transmission control unit controls the transfer of the input packet according to the first rule information corresponding to the input packet in a case where the second rule information corresponding to the destination of the input packet is not stored in the second storage unit.

4. A method of controlling a network system which includes a transmitting/receiving apparatus, a plurality of switches and a network control apparatus,
wherein the network system includes
a first packet transmission control area that is not uniquely determined a path to the receiving apparatus according to a first packet transmission control method, and
a second packet transmission control area that is uniquely determined the path to the receiving apparatus according to a second packet transmission control method,
wherein the switch includes
a first packet transmission control unit, and
a second packet transmission control unit, and
wherein the method comprising:
by the switch,
in the first packet transmission control area,
causing a first storage unit provided in the first packet transmission control unit to store a plurality of pieces of first rule information informed from the network control apparatus,
applying a mask to a predetermined position of header information of an input packet according to the number of the plurality of pieces of first rule information, and
controlling the input packet according to the first rule information selected from the first storage unit based on the header information after masking,
wherein the number of the plurality of pieces of first rule information is determined according to the number of paths from the switch included in the first packet transmission control area toward a switch included in the second packet transmission control area.

5. The method of controlling the network system according to claim 4, wherein the method further comprising:
by the switch,
in the second packet transmission control area,
causing a second storage unit provided in the second packet transmission control unit to store a plurality of pieces of second rule information informed from the network control apparatus, and
retrieving one of the plurality of pieces of second rule information which corresponds to destination information of the input packet, and transferring the input packet according to the corresponding second rule information.

6. The method of controlling the network system according to claim 5, wherein the method further comprising:

causing the second packet transmission control unit to
control the transfer of the input packet according to the
second rule information in a case where the second rule
information corresponding to the destination of the
input packet is stored in the second storage unit, and
causing the first packet transmission control unit to control the transfer of the input packet according to the first
rule information corresponding to the input packet in a
case where the second rule information corresponding
to the destination of the input packet is not stored in the
second storage unit.

7. A network control apparatus which is included in a
network system having a transmitting/receiving apparatus
and a plurality of switches, and controls the plurality of
switches,
wherein the switch includes
a first packet transmission control unit, and
a second packet transmission control unit,
wherein the network system includes
a first packet transmission control area that is not uniquely
determined a path to the receiving apparatus according
to the first packet transmission control unit, and
a second packet transmission control area that is uniquely
determined the path to the receiving apparatus according to the second packet transmission control unit, and
wherein in the first packet transmission control area,
the network control apparatus is configured
to inform the first packet transmission control unit of a
plurality of pieces of first rule information,
to cause a first storage unit provided in the first packet
transmission control unit to store the plurality of pieces
of first rule information,
to cause the first packet transmission control unit to apply
a mask to a predetermined position of header information of an input packet according to the number of the
plurality of pieces of first rule information, and to
control the input packet according to the first rule
information selected from the first storage unit based on
the header information after masking,
wherein the number of the plurality of pieces of first rule
information is determined according to the number of
paths from the switch included in the first packet
transmission control area toward a switch included in
the second packet transmission control area.

8. The network control apparatus according to claim 7,
wherein in the second packet transmission control area,
the second packet transmission control unit is informed of
a plurality of pieces of second rule information,
a second storage unit provided in the second packet
transmission control unit is caused to store the plurality
of pieces of second rule information, and
the second packet transmission control unit is caused to
retrieve one of the plurality of pieces of second rule
information which corresponds to destination information of the input packet, and transfer the input packet
according to the corresponding second rule information.

9. The network control apparatus according to claim 8,
wherein the second packet transmission control unit is
caused to control the transfer of the input packet
according to the second rule information in a case
where the second rule information corresponding to the
destination of the input packet is stored in the second
storage unit, and
the first packet transmission control unit is caused to
control the transfer of the input packet according to the
first rule information corresponding to the input packet
in a case where the second rule information corresponding to the destination of the input packet is not
stored in the second storage unit.

10. A non-transitory computer-readable recording
medium having stored therein a control program of a network control apparatus which is included in a network
system having a transmitting/receiving apparatus and a
plurality of switches, and controls the plurality of switches,
wherein the switch includes
a first packet transmission control unit, and
a second packet transmission control unit,
wherein the network system includes
a first packet transmission control area that is not uniquely
determined a path to the receiving apparatus according
to the first packet transmission control unit, and
a second packet transmission control area that is uniquely
determined the path to the receiving apparatus according to the second packet transmission control unit, and
wherein in the first packet transmission control area,
the control program, when executed by a computer provided in the network control apparatus, causes the
computer to perform
informing the first packet transmission control unit of a
plurality of pieces of first rule information,
causing a first storage unit provided in the first packet
transmission control unit to store the plurality of pieces
of first rule information, and
causing the first packet transmission control unit to apply
a mask to a predetermined position of header information of an input packet according to the number of the
plurality of pieces of first rule information, and to
control the input packet according to the first rule
information selected from the first storage unit based on
the header information after masking,
wherein the number of the plurality of pieces of first rule
information is determined according to the number of
paths from the switch included in the first packet
transmission control area toward a switch included in
the second packet transmission control area.

11. The non-transitory computer-readable recording
medium having stored therein the control program of the
network control apparatus according to claim 10,
wherein in the second packet transmission control area,
the control program causes the computer to perform
wherein in the second packet transmission control area,
the control program causes the computer to perform
informing the second packet transmission control unit of
a plurality of pieces of second rule information,
causing a second storage unit provided in the second
packet transmission control unit to store the plurality of
pieces of second rule information, and
causing the second packet transmission control unit to
retrieve one of the plurality of pieces of second rule
information which corresponds to destination information of the input packet, and to transfer the input packet
according to the corresponding second rule information.

12. The non-transitory computer-readable recording
medium having stored therein the control program of the
network control apparatus according to claim 11,
wherein the control program causes the computer to
perform
causing the second packet transmission control unit to
control the transfer of the input packet according to the
second rule information in a case where the second rule
information corresponding to the destination of the
input packet is stored in the second storage unit, and causing the first packet transmission control unit to control the transfer of the input packet according to the first rule information corresponding to the input packet in a case where the second rule information corresponding to the destination of the input packet is not stored in the second storage unit.

* * * * *